(12) United States Patent
Kato et al.

(10) Patent No.: US 9,736,087 B2
(45) Date of Patent: Aug. 15, 2017

(54) COMPUTER READABLE NON-TRANSITORY MEDIUM, ELECTRONIC MAIL INFORMATION SEND METHOD AND ELECTRONIC MAIL INFORMATION SEND DEVICE

(71) Applicant: FUJITSU LIMITED, Kawasaki-shi, Kanagawa (JP)

(72) Inventors: Yoshitaka Kato, Kamitakai (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 14/332,516

(22) Filed: Jul. 16, 2014

(65) Prior Publication Data

US 2014/0330917 A1 Nov. 6, 2014

Related U.S. Application Data

(63) Continuation of application No. PCT/JP2012/084096, filed on Dec. 28, 2012.

(30) Foreign Application Priority Data

Jan. 19, 2012 (JP) ................. 2012-009361

(51) Int. Cl.
*H04L 12/58* (2006.01)
*G06Q 10/10* (2012.01)

(52) U.S. Cl.
CPC .......... *H04L 51/00* (2013.01); *G06Q 10/107* (2013.01); *H04L 51/02* (2013.01); *H04L 51/28* (2013.01)

(58) Field of Classification Search
CPC ......... H04L 51/00; H04L 51/02; H04L 51/28; G06Q 10/107

(Continued)

(56) References Cited

U.S. PATENT DOCUMENTS 6,171,112 B1 * 1/2001 Clark .................... G06F 19/327
434/321
6,360,251 B1 3/2002 Fujita et al.
(Continued)

FOREIGN PATENT DOCUMENTS

JP 5-204795 8/1993
JP 11-24880 1/1999
(Continued)

OTHER PUBLICATIONS

International Search Report mailed Apr. 16, 2013, in corresponding International Patent Application No. PCT/JP2012/084096.

*Primary Examiner* — Kostas Katsikis
(74) *Attorney, Agent, or Firm* — Staas & Halsey LLP

(57) ABSTRACT

A computer readable, non-transitory medium storing a program that causes a computer to execute a process, the process includes: accepting electronic mail information including mail body text information and address information designated by a first user; accepting a request of a second user that designates the electronic mail information; referring to a storage unit that relates address information to human resource information of a person corresponding to the address and stores the address information and the human resource information and extracting human resource information corresponding to address information included in the electronic mail information designated by the second user; and sending the extracted human resource information to a terminal the second user uses together with the mail body text information included in the electronic mail information.

12 Claims, 32 Drawing Sheets

(58) Field of Classification Search
USPC .......................................................... 709/206
See application file for complete search history.

(56) References Cited

U.S. PATENT DOCUMENTS

| | | | |
|---|---|---|---|
| 7,895,278 B2* | 2/2011 | Hamilton, II | G06Q 10/107 709/206 |
| 7,962,506 B2* | 6/2011 | Hamilton | G06Q 10/107 707/767 |
| 8,095,604 B2* | 1/2012 | Essenmacher | G06Q 10/107 709/206 |
| 8,171,088 B2* | 5/2012 | Murphy, Jr. | G06Q 10/107 709/204 |
| 8,316,100 B2* | 11/2012 | Essenmacher | G06Q 10/107 707/609 |
| 8,375,052 B2* | 2/2013 | Bordeaux | G06Q 10/107 707/756 |
| 8,756,284 B2* | 6/2014 | Murphy | G06Q 10/107 709/204 |
| 8,930,468 B2* | 1/2015 | Vuong | G06Q 10/107 709/206 |
| 9,098,831 B1* | 8/2015 | Miles | G06Q 10/105 |
| 9,391,935 B1* | 7/2016 | Gunda | H04L 51/08 |
| 2002/0144109 A1* | 10/2002 | Benantar | H04L 63/062 713/156 |
| 2004/0019644 A1* | 1/2004 | Fellenstein | G06Q 10/107 709/206 |
| 2004/0024825 A1* | 2/2004 | Chou | G06Q 10/107 709/206 |
| 2004/0114735 A1* | 6/2004 | Arning | G06Q 10/107 379/93.24 |
| 2005/0044097 A1* | 2/2005 | Singson | G06Q 10/107 |
| 2005/0099288 A1* | 5/2005 | Spitz | G06K 17/00 340/506 |
| 2006/0129602 A1* | 6/2006 | Witriol | G06Q 10/107 |
| 2007/0005708 A1* | 1/2007 | Juliano | G06Q 10/00 709/206 |
| 2007/0294428 A1* | 12/2007 | Guy | G06Q 10/107 709/245 |
| 2008/0104075 A1* | 5/2008 | Heumesser | G06Q 10/107 |
| 2008/0104175 A1* | 5/2008 | Keohane | G06Q 10/107 709/206 |
| 2008/0104177 A1* | 5/2008 | Keohane | G06Q 10/107 709/206 |
| 2008/0104712 A1* | 5/2008 | Oliver | G06F 21/6227 726/27 |
| 2008/0147818 A1* | 6/2008 | Sabo | G06Q 10/00 709/206 |
| 2008/0189379 A1* | 8/2008 | Naick | H04L 51/063 709/206 |
| 2008/0208988 A1* | 8/2008 | Khouri | H04L 12/58 709/206 |
| 2009/0113001 A1* | 4/2009 | Manning | H04L 51/12 709/206 |
| 2009/0210504 A1* | 8/2009 | Shuster | H04L 51/28 709/206 |
| 2009/0234658 A1* | 9/2009 | Greenwell | G06Q 30/02 705/13 |
| 2009/0240657 A1* | 9/2009 | Grigsby | G06Q 10/10 |
| 2009/0259723 A1* | 10/2009 | Roic | G06Q 10/107 709/206 |
| 2010/0100463 A1* | 4/2010 | Molotsi | G06Q 10/04 705/32 |
| 2010/0161735 A1* | 6/2010 | Sharma | G06Q 10/107 709/206 |
| 2010/0174784 A1* | 7/2010 | Levey | H04L 51/34 709/206 |
| 2010/0269157 A1* | 10/2010 | Experton | G06F 19/322 726/4 |
| 2011/0213734 A1* | 9/2011 | Van Gaston | G06Q 10/00 705/500 |
| 2012/0011192 A1* | 1/2012 | Meister | G06Q 10/107 709/203 |

FOREIGN PATENT DOCUMENTS

| | | |
|---|---|---|
| JP | 2002-132799 | 5/2002 |
| JP | 2007-65787 | 3/2007 |
| JP | 2009-122957 | 6/2009 |
| JP | 2010-15327 | 1/2010 |

* cited by examiner

FIG. 4

<MAIL DB>

| USER ID | CLASS | MESSAGE ID | SENDER ID | ADDRESS | SEND DATE | MAIL INFORMATION ||
| --- | --- | --- | --- | --- | --- | --- | --- |
| | | | | | | SUBJECT | BODY TEXT |
| tanaka@xxx.ww | SEND | slkdjfa@xxx.ww | tanaka@xxx.ww | fujii@xxx.ww<br>kuroda@xxx.ww | 2011/12/20<br>15:30:23 | ...... | THIS IS TANAKA. |
| | RECEIVE | Kldjfakj@xxx.ww | yamamoto@xxx.ww | tanaka@xxx.ww<br>yamada@xxx.ww<br>satoh@yyy.ww | 2011/12/20<br>15:23:08 | ...... | THIS IS YAMAMOTO. |
| | RECEIVE | Lkjioeur@xxx.ww | fujii@xxx.ww | tanaka@xxx.ww<br>koyama@xxx.ww | 2011/12/20<br>15:07:23 | ...... | THIS IS FUJII. |
| yamada@xxx.ww | SEND | oiueryoi@xxx.ww | yamada@xxx.ww | kuroda@xxx.ww | 2011/12/20<br>15:32:34 | ...... | THIS IS YAMADA. |
| | RECEIVE | iepoirww@xxx.ww | yamamoto@xxx.ww | tanaka@xxx.ww<br>yamada@xxx.ww<br>satoh@yyy.ww | 2011/12/20<br>15:23:08 | ...... | THIS IS YAMAMOTO. |
| | RECEIVE | qoiwuoeri@xxx.ww | kuroda@xxx.ww | yamada@xxx.ww | 2011/12/20<br>15:07:12 | ...... | I'M AFRAID .... |

<AUTHORIZATION MAIL DB>                                38

| USER ID | MESSAGE ID | ADDRESS | MAIL INFORMATION | |
| --- | --- | --- | --- | --- |
| | | | SUBJECT | BODY TEXT |
| tanaka@xxx.ww | qoiwuoeri@xxx.ww | yamada@xxx.ww, tanaka@xxx.ww, fujii@xxx.ww, kuroda@xxx.ww, koyama@xxx.ww, ooyama@xxx.ww yamamoto@xxx.ww, ooyama@yyy.ww | ...... | ...... |

FIG. 12

<MAIL SHOW SCREEN>

| SENT MAIL FOLDER | NEW DOC. | REPLY TO SENDER | REPLY TO ALL | SHOW AUTHO-RIZATION SCREEN | | LOGOUT |
|---|---|---|---|---|---|---|
| | SENDER | | DATE | | SUBJECT | |
| | yamamoto@xxx.ww | | 2011/12/20 15:23:08 | | ..... | |
| | satoh@xxx.ww | | 2011/12/20 15:07:23 | | ..... | |

FIG. 18

<AUTHORIZATION REQUEST LIST SCREEN>

| AUTHO-RIZATION REQUEST LIST SCREEN | SELECT MAIL YOU WANT TO CONFIRM. | | CONFIRM |
|---|---|---|---|
| | SENDER | AUTHORIZATION REQUEST DATE | SUBJECT |
| | ☐ tanaka@xxx.ww | 2011/12/21  8:56:01 | POSITIONING OF NEW EMPLYEE |

FIG. 19

<AUTHORIZATION SCREEN>

| AUTHORIZE | REJECT |

AUTHORIZATION REQUEST DATE: 2011/12/21 8:56

SENDER: TANAKA, SOLUTIOIN DEPARTMENT

ADDRESS: yamada@xxx.ww, tanaka@xxx.ww, fujii@xxx.ww, KURODA-SAN 、koyama@xxx.ww, ooyama@xxx.ww, yamamoto@xxx.ww, ooyama@yyy.ww,

SUBJECT: NEW EMPLOYEE

POSITION SHOW

TO WHOM IT MAY CONCERN
CC: DEAR HUMAN RESOUCE MANAGER

REQUEST

THANK YOU FOR ....

FIG. 20

<AUTHORIZATION SCREEN 2>

| AUTHORIZE | REJECT |

AUTHORIZATION REQUEST DATE: 2011/12/21 8:56

SENDER: TANAKA, SOLUTIOIN DEPARTMENT

ADDRESS:
- A  MANAGER  ICHIRO YAMADA
      CHIEF    JIRO TANAKAN, SABURO FUJII
      STAFF    SHIRO KURODA, GORO KOYAMA
- B  MANAGER  ROKURO OYAMA
      CHIEF    SHICHIRO YAMAMOTO
- EXTERNAL  POSITION UNKNOWN  ooyama@yyy.ww

SUBJECT: NEW EMPLOYEE

| PUT BACK |

TO WHOM IT MAY CONCERN

CC: DEAR HUMAN RESOUCE MANAGER

REQUEST

THANK YOU FOR ....

FIG. 22

<MESSAGE CREATION SCREEN>

| MESSAGE CREATION SCREEN | SEND    SAVE                                    LOGOUT |
|---|---|
| | ADDRESS  A         MANAGER  ICHIRO YAMADA |
| |                    CHIEF    JIRO TANAKAN |
| |                    STAFF    SHIRO KURODA |
| |           B        MANAGER  ROKURO OYAMA |
| |                    CHIEF    SHICHIRO YAMAMOTO |
| |           EXTERNAL POSITION ooyama@yyy.ww |
| |                    UNKNOWN |
| | CC       [                                    ] |
| | SUBJECT  Re:POSITIONING OF NEW EMPLOYEE |
| | TEXT ENTRY SCREEN |
| | >TO WHOM IT MAY CONCERN |
| | >CC: DEAR HUMAN RESOUCE MANAGER |
| |        >REQUEST |
| | >THANK YOU FOR .... |

COMPUTER READABLE NON-TRANSITORY MEDIUM, ELECTRONIC MAIL INFORMATION SEND METHOD AND ELECTRONIC MAIL INFORMATION SEND DEVICE

CROSS-REFERENCE TO RELATED APPLICATION

This application is a continuation application of PCT/JP2012/084096 filed on Dec. 28, 2012, which claims priority to Japanese Patent Application No. 2012-009361 filed on Jan. 19, 2012, the contents of which are herein wholly incorporated by reference.

FIELD

A certain aspect of embodiments described herein relates to a computer readable non-transitory medium, an electronic mail information send method and an electronic mail information send device.

BACKGROUND

Various technologies having a purpose of supporting making an electronic mail or providing detailed information of an electronic mail is being known.

Japanese Patent Application Publication No. 5-204795 (hereinafter referred to as Document 1) discloses a technology in which a tree diagram of office information is shown and a user is designated as a destination from the tree diagram in order to prevent a person making an electronic mail and sending the electronic mail (hereinafter referred to as a sender) from designating an erroneous destination. Japanese Patent Application Publication No. 11-24880 (hereinafter referred to as Document 2) discloses a technology in which a member recorded in a mailing list is shown to a receiver of a mail sent to the mailing list, and the receiver is informed of another receiver except for himself or herself.

SUMMARY

According to an aspect of the present invention, there is provided a computer readable, non-transitory medium storing a program that causes a computer to execute a process, the process including: accepting electronic mail information including mail body text information and address information designated by a first user; accepting a request of a second user that designates the electronic mail information; referring to a storage unit that relates address information to human resource information of a person corresponding to the address and stores the address information and the human resource information and extracting human resource information corresponding to address information included in the electronic mail information designated by the second user; and sending the extracted human resource information to a terminal the second user uses together with the mail body text information included in the electronic mail information.

According to another aspect of the present invention, there is provided an electronic mail information send method that makes a computer execute a process, the process including: accepting electronic mail information including mail body text information and address information designated by a first user; accepting a request of a second user that designates the electronic mail information; referring to a storage unit that relates address information to human resource information of a person corresponding to the address and stores the address information and the human resource information and extracting human resource information corresponding to address information included in the electronic mail information designated by the second user; and sending the extracted human resource information to a terminal the second user uses together with the mail body text information included in the electronic mail information.

According to another aspect of the present invention, there is provided an electronic mail information send device including: a memory; and a circuitry, wherein the circuitry is configured: to accept electronic mail information including mail body text information and address information designated by a first user; and to accept a request of a second user that designates the electronic mail information; wherein the memory is configured to relate address information to human resource information of a person corresponding to the address and store the address information and the human resource information, wherein the circuitry is configured: to extract human resource information corresponding to address information included in the electronic mail information designated by the second user from the memory; and to send the extracted human resource information to a terminal the second user uses together with the mail body text information included in the electronic mail information.

BRIEF DESCRIPTION OF DRAWINGS

FIG. 4 illustrates a data structure of a mail DB of FIG. 3;

FIG. 6 illustrates a data structure of an authorization mail DB of FIG. 3;

FIG. 12 illustrates an example of a mail-show screen in accordance with the first embodiment;

FIG. 18 illustrates an example of an authorization request list screen in accordance with the first embodiment;

FIG. 19 illustrates an example of an authorization screen 1 in accordance with the first embodiment;

FIG. 20 illustrates an example of an authorization screen 2 in accordance with the first embodiment;

FIG. 22 illustrates an example of a message creation screen in accordance with the second embodiment;

DESCRIPTION OF EMBODIMENTS

When a user browses an electronic mail written by a sender, it may be necessary to confirm information of a user to whom a destination of the electronic mail is designated.

For example, when it is necessary for a sender to gain his or her supervisor's approval before sending a mail including confidential matter, it is necessary for the supervisor to check whether destinations of the mail include a non-authorized person. For example, when a receiver receiving a mail including a plurality of destinations (broadcast mail) sends a reply mail to the sender and at least one of the destinations, it is necessary for the supervisor to check whether the destinations of the reply mail include a non-authorized person.

That is, it is very important for the supervisor or the receiver to obtain information of people included in the destinations of the mail in view of information leak.

The technology of Document 1 prevents a sender from designating an erroneous destination. However, it is difficult for a person different from the sender (a supervisor performing authorization or a receiver) to recognize information of a person of a destination. It is not supposed that the technology of Document 2 is used for an approval by a supervisor or checking of destination of a receiver of a broadcast mail. Therefore, it is difficult to use letter strings indicating a message address of a group member of a mailing list shown in Document 2 as useful information during authorizing by a supervisor or checking of a destination of a reply mail.

First Embodiment

Figure 1:
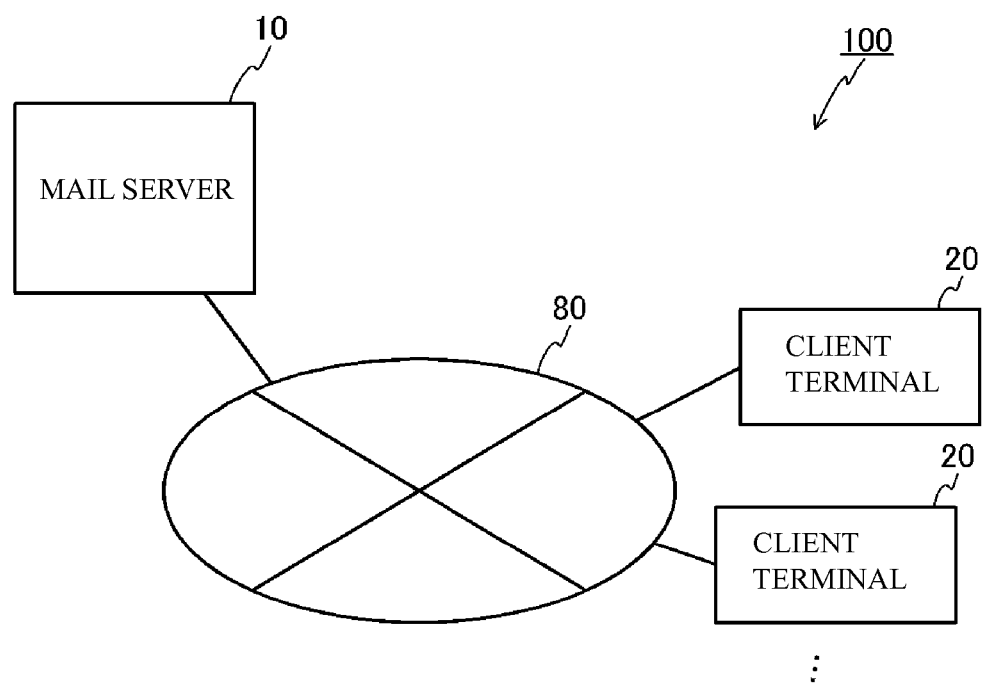
FIG. 1 illustrates a schematic view of an electronic mail system in accordance with a first embodiment.

A description will be given of a first embodiment of an electronic mail system in detail with reference to FIG. 1 to FIG. 20. FIG. 1 illustrates a schematic view of an electronic mail system 100 in accordance with the first embodiment.

The electronic mail system 100 has a mail server 10 and a client terminal 20 as illustrated in FIG. 1. The mail server 10 and the client terminal 20 are coupled to a network 80 such as internet or LAN. The electronic mail system is a system in which a user performs inputting or operating with a WEB mail screen (provided by the mail server 10) shown on a browser in the client terminal 20 and thereby sending and receiving of electronic mail can be allowed between the client terminals 20. In the embodiment, users using the client terminal 20 belong to an identical company. That is, all electronic mails sent from the client terminal 20 is an electronic mail sent from the company.

Figure 2A:
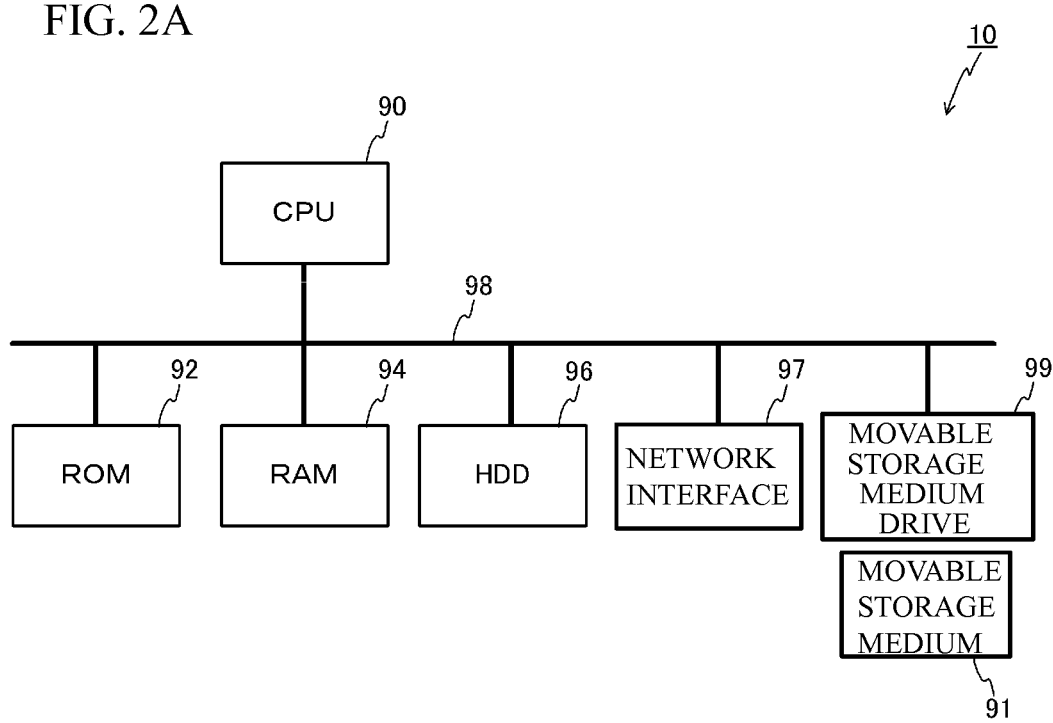
FIG. 2A illustrates a hardware structure of a mail server of FIG. 1.

FIG. 2A illustrates a hardware structure of the mail server 10. As illustrated in FIG. 2A, the mail server 10 has a CPU (Central Processing Unit) 90, a ROM (Read Only Memory) 92, a RAM (Random Access Memory) 94, a storage unit (HDD (Hard Disk Drive)) 96, a network interface 97, a movable storage medium drive 99 and so on. Each device of the mail server 10 is coupled to a bus 98. In the mail server 10, functions illustrated in FIG. 3 are realized when the CPU 90 executes a program stored in the ROM 92 or the HDD 96 (including electronic mail information send program) or a program (including electronic mail information send program) that the movable storage medium drive 99 reads from the movable storage medium 91.

Figure 2B:
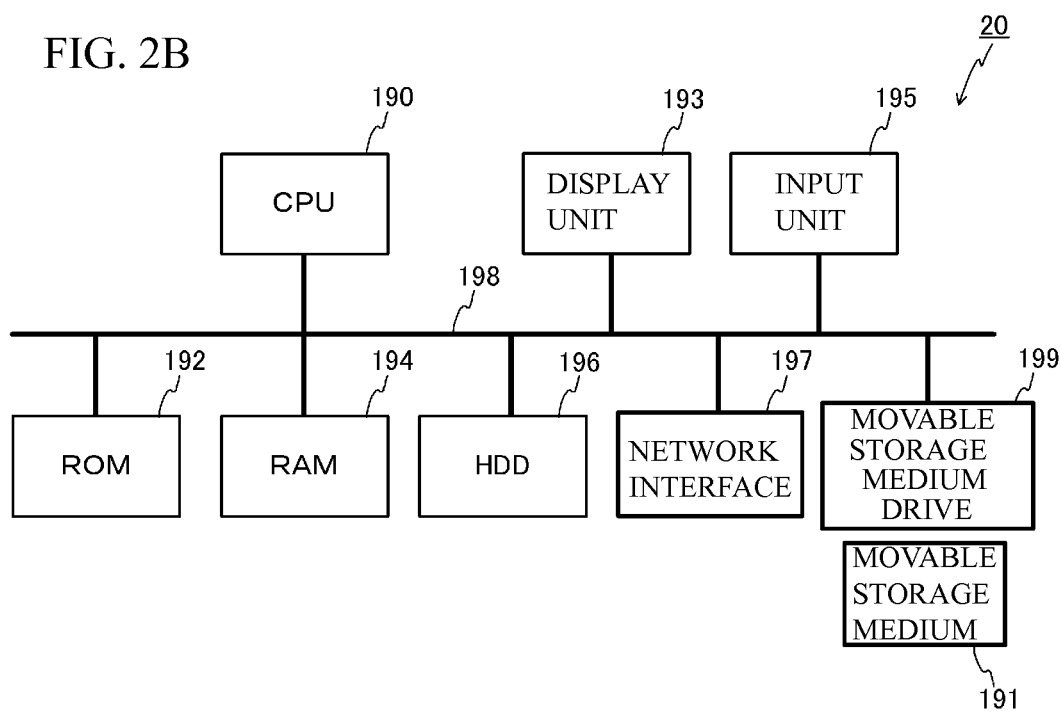
FIG. 2B illustrates a hardware structure of a client terminal of FIG. 1.

FIG. 2B illustrates a hardware structure of the client terminal 20. As illustrated in FIG. 2B, the client terminal 20 has a CPU 190, a ROM 192, a RAM 194, a storage unit (HDD) 196, a display unit 193, an input unit 195, a network interface 197, a movable storage medium drive 199 and so on. Each device of the client terminal 20 is coupled to a bus 198. In the client terminal 20, when the CPU 190 executes a program, the functions of FIG. 3 are realized.

Figure 3:
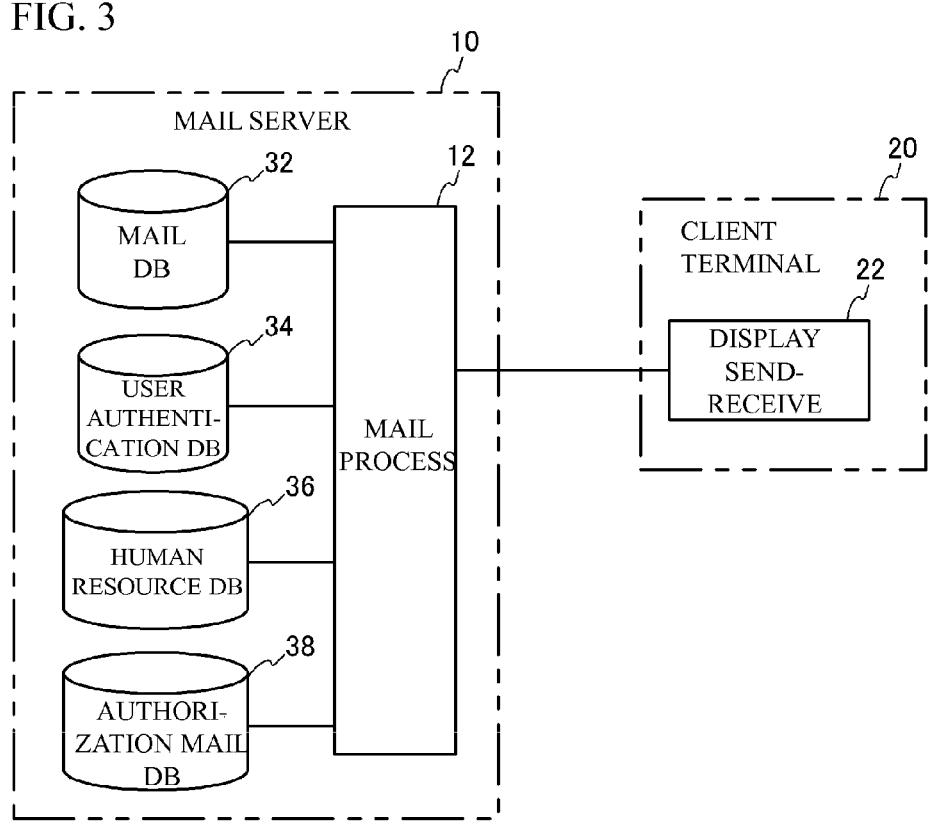
FIG. 3 illustrates a function block diagram of the mail server and the client terminal of FIG. 1.

FIG. 3 illustrates a function block diagram of the mail server 10 and the client terminal 20. As illustrated in FIG. 3, in the mail server 10, when the CPU 90 executes a program, a function as a mail process unit 12 is realized. In the client terminal 20, when the CPU 190 executes a program, a function as a display send-receive unit 22 is realized. FIG. 3 also illustrates a mail DB 32, a user authentication DB 34, a human resource DB 36, and an authorized mail DB 38.

The mail process unit 12 makes a WEB mail screen, sends a screen to the client terminal 20, performs sending-receiving of the WEB mail. The mail process unit 12 provides information (including human resource such as office organization) of an address of the electronic mail to the client terminal 20.

The display send-receive unit 22 shows a WEB mail screen sent from the mail process unit 12 on a browser. The display send-receive unit 22 sends information input by a user of the client terminal 20 or an instruction from the user (instruction input on the browser) to the mail server 10.

The mail DB 32 is a database that stores information of an electronic mail sent and received between the client terminals 20. The mail DB 32 has fields of "user ID", "class", "message ID", "sender", "address ID", "sending date", and "mail information (subject and body text)". A user ID of a user performs sending or receiving an email is input into the "user ID" field. Information whether an email is sent from a user corresponding to a user ID or received by the user is input into the "class" field. A unique ID defined with respect to each electronic mail is input into the "message ID" field. A subject and a body text of an electronic mail are input into the "mail information (subject and body text)". In the embodiment, the single mail DB 32 stores information of sent-received mail of a plurality of users. However, folders may be prepared with respect to each user, and the sent-received mail information corresponding to the user may be stored under the folder. In this case, the user ID field is not necessary.

Figure 5A:
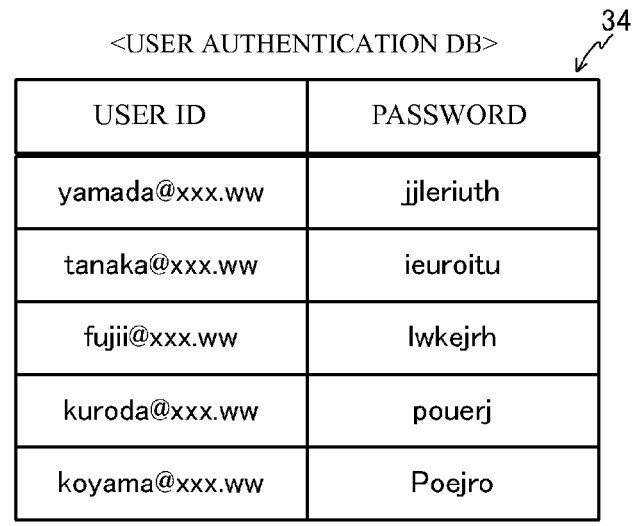
FIG. 5A illustrates a data structure of a user authentication DB of FIG. 3.

Returning to FIG. 3, the user authentication DB 34 is a database that stores information used for authentication at a login of a user. The user authentication DB 34 stores a user ID and a password corresponding to the user ID as illustrated in FIG. 5A.

Figure 5B:
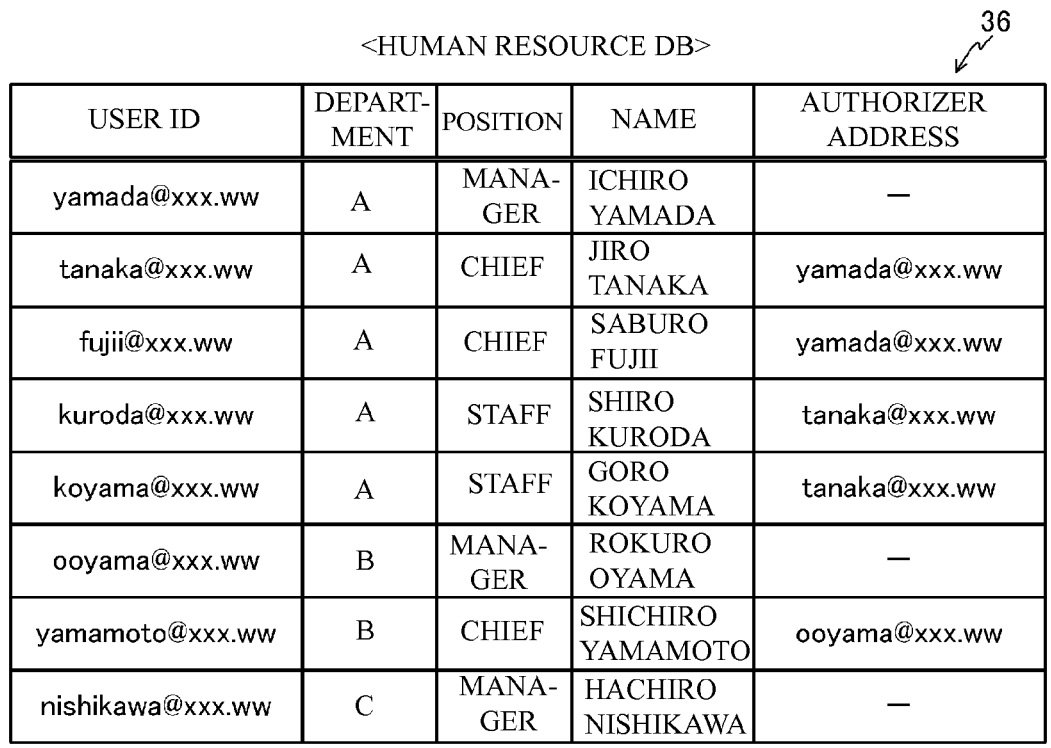
FIG. 5B illustrates a data structure of a human resource DB of FIG. 3

The human resource DB 36 has fields of "user ID", "department", "official position", "name" and "authorizer address" as illustrated in FIG. 5B. A department and an official position of a person corresponding to a user ID are input into the "department" field and the "official position" field. A name of a person corresponding to a user ID is input into the "name" field. An electronic mail address of an authorizer of a person corresponding to a user ID (a person authorizing when a user sends an electronic mail) is input into the "authorizer address" field. The human resource DB 36 is made by an administrator in advance. When the human resource is changed, the administrator or the like updates the human resource DB 36.

The authorized mail DB 38 is a database that stores an electronic mail needing an authorization (an electronic mail which a user of which authorizer address is input in the human resource DB 36 of FIG. 5B is going to send, hereinafter referred to as "authorization mail"). The authorization mail DB 38 is made with respect to each authorizer. FIG. 6 illustrates the authorized mail DB 38 of an authorizer (Ichiro Yamada (user ID: yamada@xxx.ww)). The authorized mail DB 38 has fields of "user ID", "message ID", "address" and "mail information (subject and body text)". An ID of a user (follower of the authorizer) that is going to send an electronic mail (authorization mail) is input into the "user ID" field. An address designated in an authorization mail is input into the "address" field. The rest are the same as the mail BD of FIG. 4.

Next, a description will be given of a process of the mail process unit 12 and the display send-receive unit 22 in accordance with the first embodiment with reference to FIG. 7 to FIG. 20.

Figure 7:
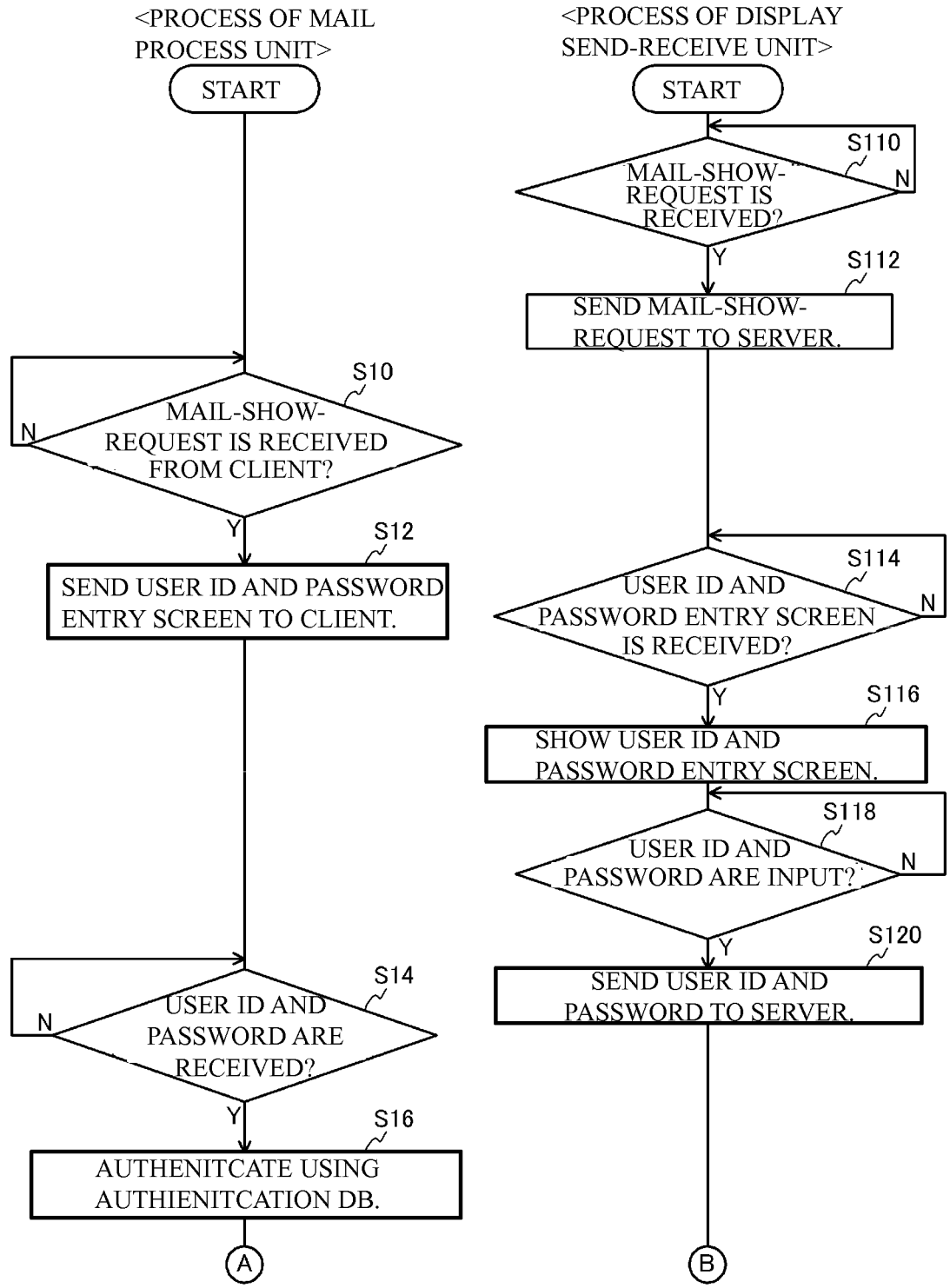
FIG. 7 illustrate a flowchart (part 1) of a sequence of a process of a mail process unit and a display send-receive unit.
Figure 8:
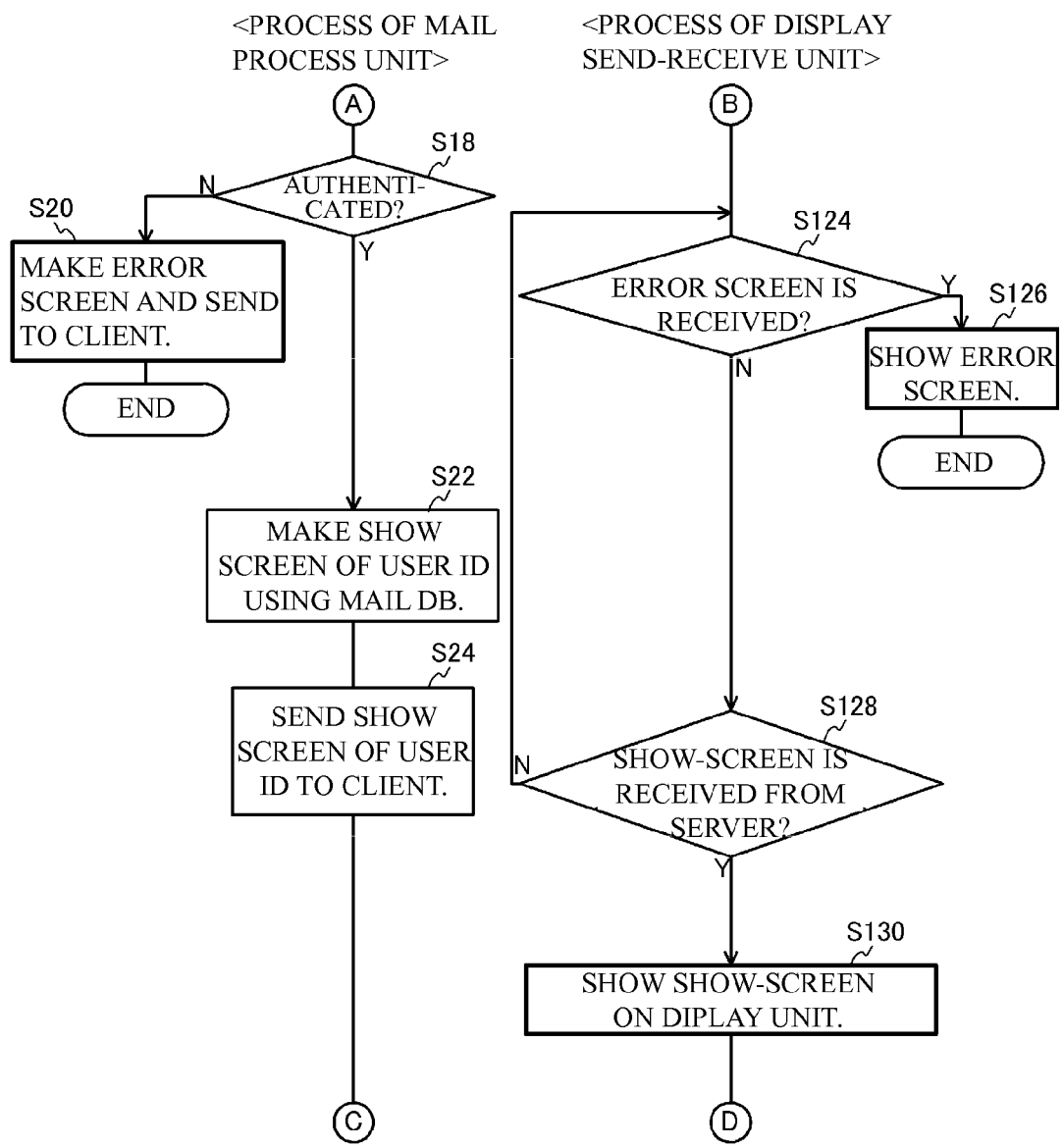
FIG. 8 illustrate the flowchart (part 2) of the sequence of the process of the mail process unit and the display send-receive unit.
Figure 9:
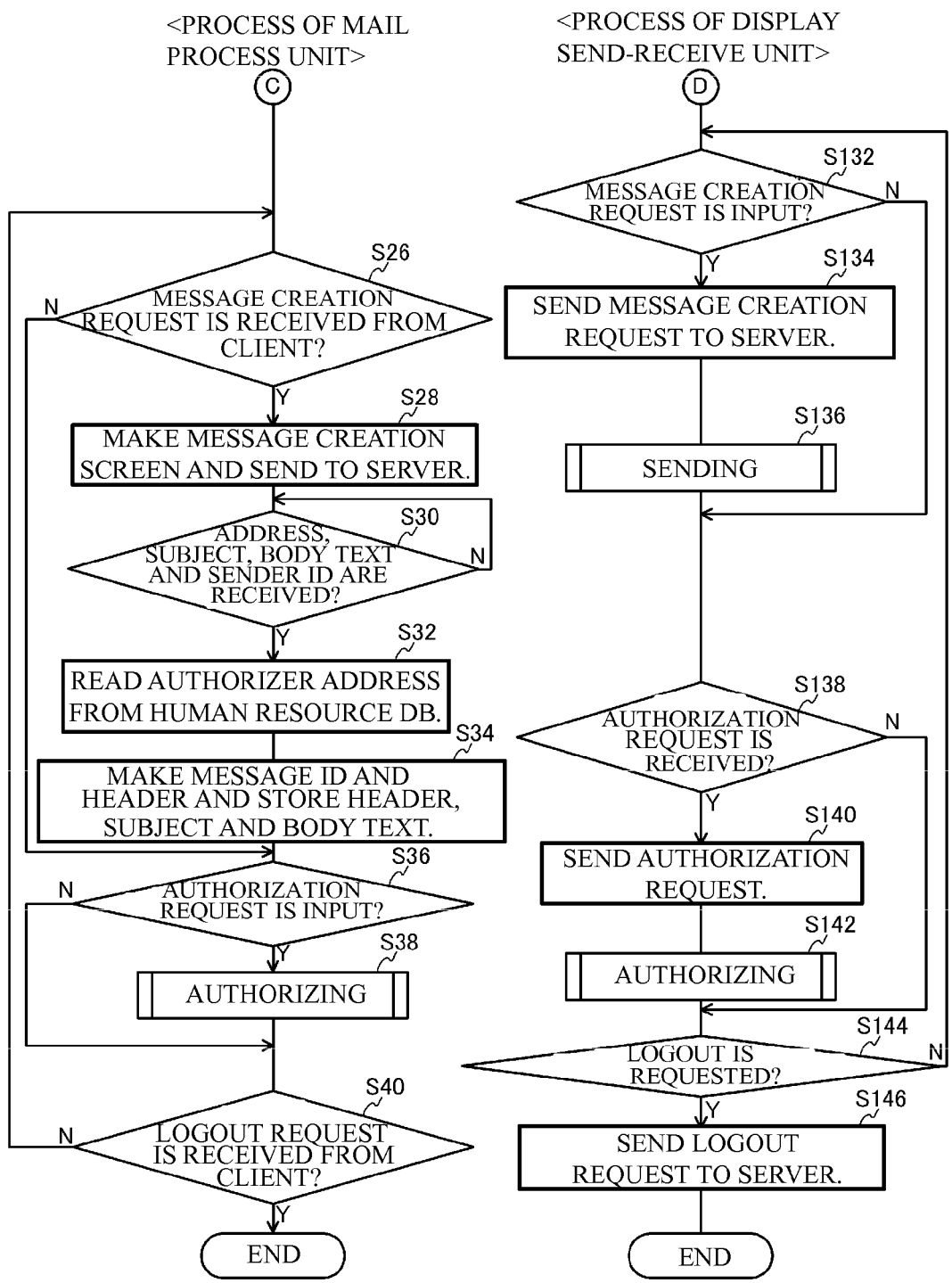
FIG. 9 illustrate the flowchart (part 3) of the sequence of the process of the mail process unit and the display send-receive unit.
Figure 10:
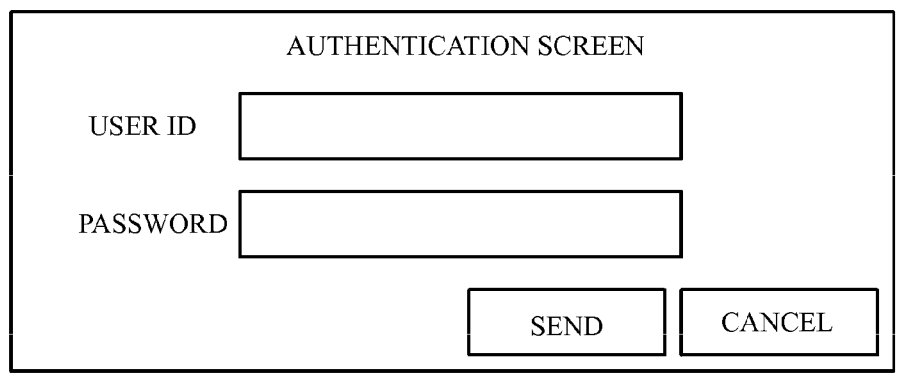
FIG. 10 illustrates an example of authentication screen in accordance with the first embodiment.
Figure 11:
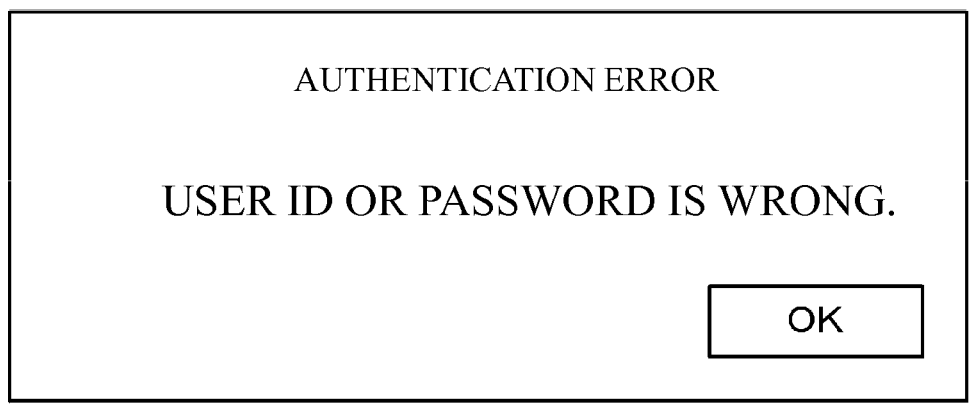
FIG. 11 illustrates an example of an authentication error screen in accordance with the first embodiment.

FIG. 7 to FIG. 9 illustrate a sequence of the process of the mail process unit 12 and the display send-receive unit 22. In the flowchart of FIG. 7 to FIG. 9, each process and determination is located in view of a timing of the process of the mail process unit 12 and the display send-receive unit 22.

In the process of FIG. 7, in a Step S110, the display send-receive unit 22 holds it until a show-request of an electronic mail is input by a user. The show-request is performed by accessing an address of WEB mail on the browser by a user. When it is determined as "Yes" in the Step S110, a Step S112 is executed. When the Step S112 is executed, the display send-receive unit 22 sends a mail show-request to the mail server 10 (the mail process unit 12).

With respect to this case, the mail process unit 12 holds it until the mail process unit 12 receives the mail show-request from the client terminal 20 (display send-receive unit 22) in the Step S10. Therefore, the mail process unit 12 executes a Step S12 when the display send-receive unit 22 sends the mail show-request in the Step S112.

In the Step S12, the mail process unit 12 sends a user ID and a password entry screen to the client terminal 20 (the display send-receive unit 22). The input screen is an authentication screen illustrated in FIG. 10 (a screen including a user ID entry field, a password entry field, a send button and a cancel button).

On the other hand, the display send-receive unit 22 holds it until the display send-receive unit 22 receives a user ID and password entry screen from the mail process unit 12 of the mail server 10 in a Step S114 after the Step S112. Therefore, as mentioned above, when the entry screen is sent from the mail server 10 side in the Step S12, the display send-receive unit 22 executes a Step S116.

In the Step S116, the display send-receive unit 22 shows the user ID and password entry screen (FIG. 10) on the display unit 193 (in the browser) of the client terminal 20. Next, in a Step S118, the display send-receive unit 22 holds it until a user ID and a password are input. In this case, when a user inputs a user ID and a password with use of the input unit 195 of the client terminal 20 and presses the send button, a Step S120 is executed.

When the Step S120 is executed, the display send-receive unit 22 sends the user ID and the password to the mail server 10 (the mail process unit 12). When the Step S120 is terminated, a Step S124 is executed.

With respect to this case, the mail process unit 12 holds it until a user ID and a password are sent from the client terminal 20 (the display send-receive unit 22) after the Step S12. Therefore, when a user ID and so on are sent from the display send-receive unit 22, the mail process unit 12 executes a Step S16.

When the Step S16 is executed, the mail process unit 12 performs an authentication of a user with use of the user ID and the password sent from the client terminal 20 and the user authentication DB 34. After that, a Step S18 is executed of FIG. 8.

When the Step S18 of FIG. 18 is executed, the mail process unit 12 determines whether the authentication is succeeded. When it is determined as "No", the mail process unit 12 makes an authentication error screen (FIG. 11), sends the screen to the client terminal 20 (the display send-receive unit 22) and terminate all process of FIG. 7 to FIG. 9. On the other hand, when it is determined as "Yes" in the Step S18, a Step S22 is executed.

In the Step S22, the mail process unit 12 makes a mail-show screen corresponding the user ID with use of the mail DB 32. The mail-show screen is illustrated in FIG. 12. Next, in the Step S24, the mail process unit 12 sends the mail-show screen (FIG. 12) to the client terminal 20 (the display send-receive unit 22). After that, a Step S26 is executed of FIG. 9.

On the other hand, the display send-receive unit 22 holds it until the display send-receive unit 22 receives the authentication error screen from the mail server 10 (the mail process unit 12) or until the display send-receive unit 22 receives the mail-show screen from the mail server 10 (the mail process unit 12) (S124, S128). Therefore, when the display send-receive unit 22 receives the authentication error screen from the mail process unit 12 and it is determined as "Yes" in the Step S124, a Step S126 is executed. When the Step S126 is executed, the display send-receive unit 22 shows the authentication error screen (FIG. 11) on the display unit 193 and, after that, terminates all processes of FIG. 7 to FIG. 9.

When the display send-receive unit 22 receives the mail-show screen (FIG. 12) from the mail process unit 12 without receiving the authentication error screen, it is determined as "Yes" in the Step S128 and a Step S130 is executed. When the Step S130 is executed, the display send-receive unit 22 shows the mail-show screen (FIG. 12) on the display unit 193 of the client terminal 20 (in the browser). After that, a Step S132 of FIG. 9 is executed.

When the Step S132 of FIG. 9 is executed, the display send-receive unit 22 determines whether a message creation request is input from a user (a sender of an electronic mail as a first user). In this case, the user is capable of outputting the message creation request by pressing one of a "new document" button, a "reply to sender" button or a "reply to all" button on the mail-show screen. When it is determined as "No" in the Step S132, a Step S138 is executed. On the other hand, when it is determined as "Yes" in the Step S132, a Step S134 is executed.

In the Step S134, the display send-receive unit 22 sends a message creation request to the mail process unit 12 of the mail server 10. After that, a subroutine (FIG. 13) of a sending process of a Step S136.

With respect to this case, the mail process unit 12 determines whether the mail process unit 12 receives the message creation request from the client terminal 20 (the display send-receive unit 22) in a Step S26. When it is determined as "No", a Step S36 is executed. When it is determined as "Yes", a Step S28 is executed. Executing of the Step S28 means a case where a process of a Step S134 is performed in the display send-receive unit 22.

Figure 13:
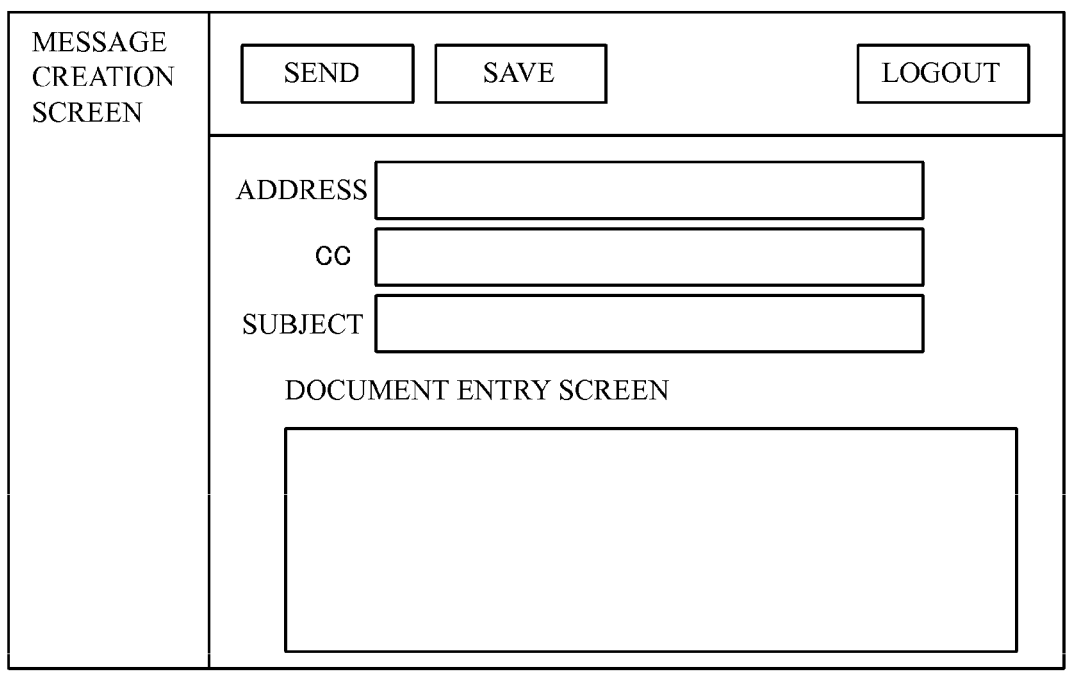
FIG. 13 illustrates an example of a mail creation screen in accordance with the first embodiment.

When the Step S28 is executed, the mail process unit 12 makes a message creation screen and sends the message creation screen to the client terminal 20 (the display send-receive unit 22). The message creation screen is illustrated in FIG. 13. When the message creation request is "new document", the mail process unit 12 sends the screen of FIG. 13. When the message creation request is "reply to sender", the mail process unit 12 reads a sender address (user ID), a subject and a body text of a reply source mail from the mail DB 32. And, the mail process unit 12 shows the sender address in the address field of the message creation screen of FIG. 13 and sends a screen in which the subject and the body text are shown in the subject field and the document entry field (a subject to which "Re:" indicating a reply is added, and a body text to which ">" indicating cited is added). When the message creation request is "reply to all", the mail process unit 12 reads the sender address (user ID), the address, the subject and body text of the reply source electronic mail from the mail DB 32. The mail process unit 12 shows the sender address and the addresses except for itself in the address field of the message creation screen of FIG. 13 and sends a screen in which the subject and the body text are shown in the subject field and the document entry field (a subject to which "Re:" indicating a reply is added, and a body text to which ">" indicating cited is added).

Figure 14:
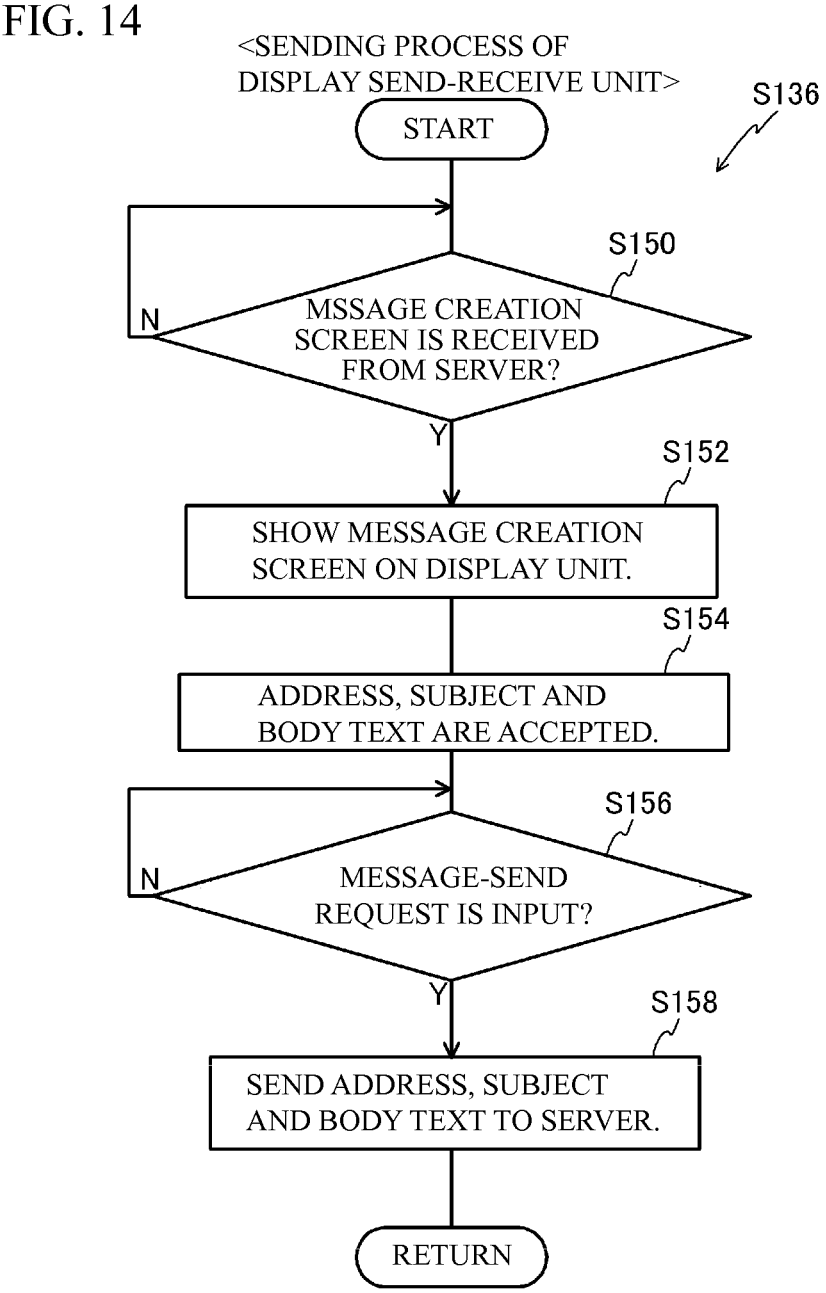
FIG. 14 illustrates a flowchart of details of a sending process (Step S136) by the display send-receive unit in accordance with the first embodiment.

A description will be given of a sending process (Step S136) performed by the display send-receive unit 22 in detail. FIG. 14 illustrates a flowchart of a detail sending process.

In the process of FIG. 14, in a Step S150, the display send-receive unit 22 holds it until the display send-receive unit 22 receives the message creation screen from the mail server 10 (the mail process unit 12). In this case, when the message creation screen (FIG. 14) is sent from the mail process unit 12 in the Step S28 of FIG. 7, a Step S152 is executed.

When the Step S152 is executed, the display send-receive unit 22 shows the message creation screen of FIG. 13 received from the mail process unit 12 on the display unit 193 (in the browser).

Next, in a Step S154, an address, a subject and a body text are input into the display send-receive unit 22 by a user. Next, in a Step S156, the display send-receive unit 22 holds it until a message-send request is input. In this case, the message-send request is input into the display send-receive unit 22 when the user presses the send button in the screen of FIG. 13. When the message-send request is input into the display send-receive unit 22, a Step S158 is executed and the address, the subject and the body text are sent to the mail server 10 (the mail process unit 12). At the sending of the Step S158, a user ID of the user pressing the send button (sender ID) is sent. After that, a Step S138 of FIG. 9 is executed.

With respect to this case, the mail process unit 12 holds it until the mail process unit 12 receives the address the subject, the body text as mail text information and the sender ID. Therefore, the mail process unit 12 executes a Step S32 at a timing when the Step 158 of FIG. 14 is executed. The Step S30 is a process in which electronic mail information including the body text and the address designated by the user as a sender (first user) is accepted. That is, the mail process unit 12 has a function as an information accept unit.

When the Step S32 is executed, the mail process unit 12 refers to the human resource DB 36 (FIG. 5B) and reads an address of an authorizer (authorizer address) corresponding to the sender ID. For example, when the sender ID is "tanaka@xxx.ww", "tanaka@xxx.ww" is read as the authorizer address. In the embodiment, the authorizer with respect to the sender is a second user. However, the second user is not limited to the authorizer.

Next, in a Step S34, the mail process unit 12 generates a message ID and a header and stores the header, the subject and the body text in the authorization mail DB 38 with respect to the authorizer. In this case, for example, a mail the user ID "tanaka@xxx.ww" is going to send is stored in the authorization mail DB 38 of an authorizer "Ichiro Yamada" of FIG. 6.

On the other hand, the display send-receive unit 22 executes a Step S138 after it is determined as "No" in the Step S132 (the message creation request is not input" or after the Step S136 (sending process) is terminated. In the Step S138, the display send-receive unit 22 determines whether an authorization request (showing of authorization screen) is input. In this case, in the mail-show screen of FIG. 12, it is determined as "Yes" in the Step S138, when the user (the authorizer as the second user) presses the "authorization-screen-show" button. When it is determined as "Yes" in the Step S138, a Step S140 is executed. And, the display send-receive unit 22 sends an authorization request to the mail server 10 (the mail process unit 12). After that, a Step S142 (authorization process) is executer. On the other hand, when it is determined as "No" in the Step S138, a Step S144 is executed.

With respect to this case, the mail process unit 12 determines whether an authorization request is input in the Step S36. When it is determined as "Yes" (the display send-receive unit 22 executes the Step S140), a Step S38 (authorization process) is executed. On the other hand, when it is determined as "No" in the Step S36, a Step S40 is executed.

A description will be given of an authorization process (S38 and S142) in the mail process unit 12 and the display send-receive unit 22 along flowcharts of FIG. 15 to FIG. 17 in detail.

Figure 15:
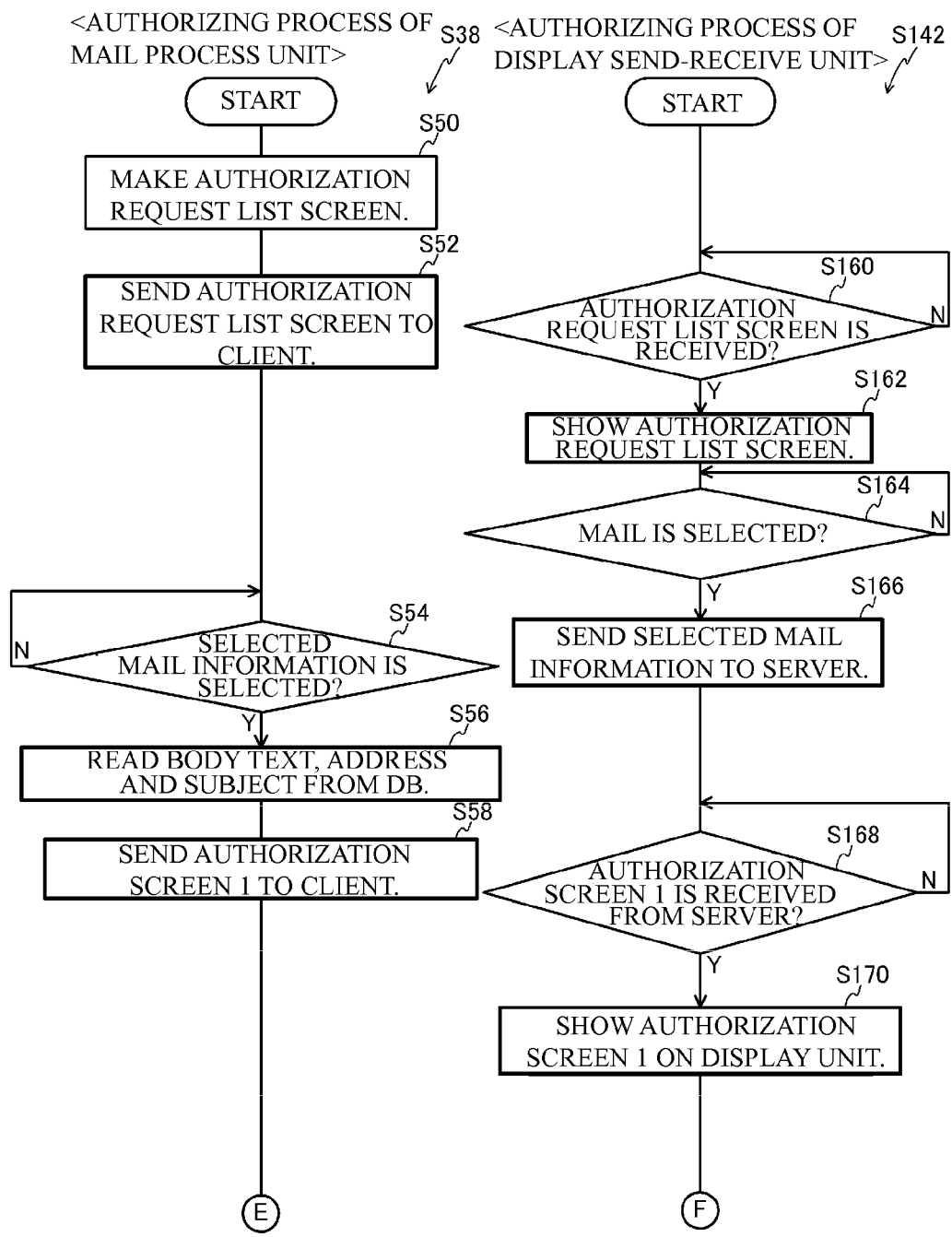
FIG. 15 illustrates a flowchart (part 1) of an authorizing process in accordance with the first embodiment.

In the process of FIG. 15, the mail process unit 12 makes an authorization request list screen with use of the authorization mail DB 38 in a Step S50. In concrete, the mail process unit 12 reads information such as a sender or a subject from the authorization mail DB 38 of FIG. 6 and makes an authorization request list screen illustrated in FIG. 18. Next, in a Step S52, the mail process unit 12 sends the authorization request list to the client terminal (the display send-receive unit 22).

On the other hand, the display send-receive unit 22 holds it until the display send-receive unit 22 receives the authorization request list screen in a Step S160 after starting the process of FIG. 15. Therefore, when the mail process unit 12 executes the Step S52, the display send-receive unit 22 executes a Step S162.

When the Step S162 is executed, the display send-receive unit 22 shows the authorization request list screen (FIG. 18) on the display unit 193 (in the browser). Next, in a Step S164, the display send-receive unit 22 determines whether the user (the authorizer) selects an electronic mail he or she wants to authorize from the authorization request list screen. The user (the authorizer) can select an electronic mail by pressing the "authorization confirm" button after checking a head checkbox of electronic mails of FIG. 18 he or she wants to authorize.

When the user (the authorizer) selects an electronic mail and it is determined as "Yes" in the Step S164, a Step S166 is executed. In the Step S166, the display send-receive unit 22 sends information of selected mail to the mail server 10 (the mail process unit 12).

With respect to this case, the mail process unit holds it until the mail process unit 12 receives information of a mail selected by the authorizer in the Step S54 after the Step S52. Therefore, when the display send-receive unit 22 executed the Step S166, the mail process executes a Step S56.

When the Step S56 is executed, the mail process unit 12 reads a body text, an address and a subject of the selected electronic mail from the authorization mail DB 38. Next, in a Step S58, the mail process unit 12 makes an authorization screen 1 illustrated in FIG. 19 with use of the body text, the address and the subject read in the Step S56, and sends the screen to the client terminal 20 (the display send-receive unit 22). After that, a Step S60 of FIG. 16 is executed. The authorization screen 1 of FIG. 19 includes an "authorize" button, a "reject" button, information of a sender, an address, a subject and a body text, and a "official-position-show" button". A name (for example "Kuroda-san" of FIG. 19) recorded in an address book of a sender of the electronic mail is shown in the address field. When names are not recorded, a mail address (user ID) is shown in the address field.

On the other hand, the display send-receive unit 22 holds it until the display send-receive unit 22 receives the authorization screen 1 from the mail server 10 (the mail process unit 12) in a Step S168 after the Step S166. Therefore, when the mail process unit 12 executes the Step S158, the display send-receive unit 22 executes a Step S170.

In the Step S170, the display send-receive unit 22 shows the received authorization screen 1 (FIG. 19) on the display unit 193 (in the browser). After that, a Step S172 of FIG. 16 is executed.

Figure 16:
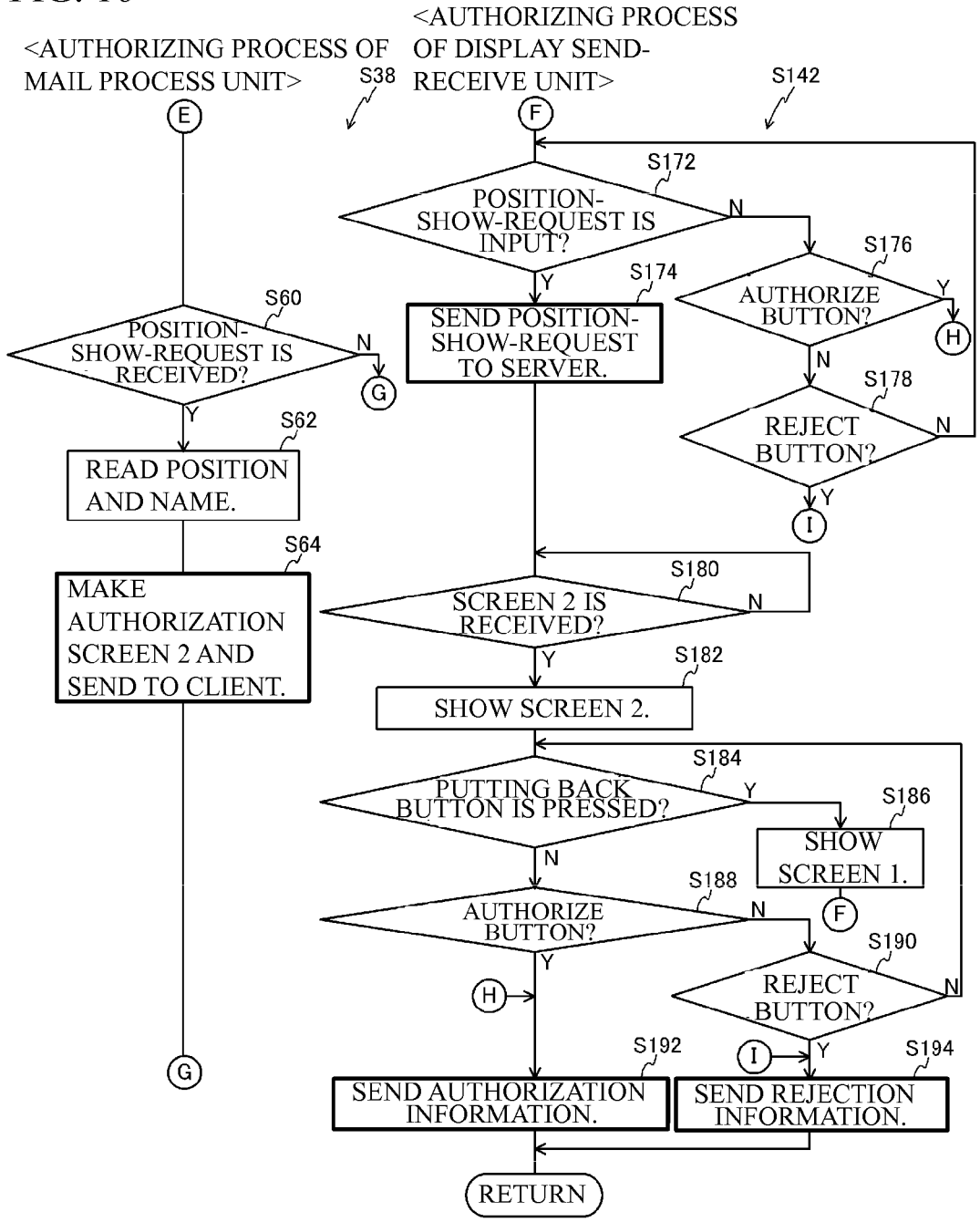
FIG. 16 illustrates the flowchart (part 2) of the authorizing process in accordance with the first embodiment.

In the Step S172 of FIG. 16, the display send-receive unit 22 determines whether an official-position-show-request is input into the display send-receive unit 22 by an authorizer. In this case, the authorizer is capable of outputting the official-position-show-request by pressing the "official-position-show" button of the authorization screen 1 of FIG. 19. When it is determined as "Yes" in the Step S172, a Step S176 is executed.

When the Step S176 is executed, the display send-receive unit 22 determines whether an authorizer presses the "authorize" button. When it is determined as "No" in the Step S176, the display send-receive unit 22 determines whether the authorizer presses the "reject" button in the Step S178. When it is determined as "No" in the Step S178, the Step S172 is executed. That is, the determination loop of the Step S172, the Step S176 and the Step S178 is repeated while the authorizer presses no button.

On the other hand, when the authorizer presses the "official-position-show" button (S172: Yes), a Step S174 is executed. When the authorizer presses the "authorize" button (S176: Yes), a Step S192 is executed. When the authorizer presses the "reject" button (S178: Yes), a Step S194 is executed.

When the authorizer presses the "official-position-show" button and the Step S174 is executed, the display send-receive unit 22 sends an official-position-show-request to the mail server 10 (the mail process unit 12).

With respect to this case, the mail process unit 12 determines whether the mail process unit 12 receives the official-position-show-request from the display send-receive unit 22 in the Step S60 after the Step S58 of FIG. 15. When it is determined as "Yes" (that is, the display send-receive unit 22 executes the Step S174), the Step S62 is executed. When it is determined as "No", the Step S66 of FIG. 17 is executed. The mail process unit 12 acts as a request accept unit for accepting a request (official-position-show-request) designating an electronic mail by an authorizer.

When the Step S62 is executed, the mail process unit 12 reads an official position and a name of each address from the human resource DB 36. In concrete, the mail process unit 12 refers to the human resource DB 36 that relates an address to an official position and a name of a person corresponding to the address and stores the address, the official position and the name, and reads a department, an official position and a name of an address (user ID) included in an electronic mail designated by the authorizer. That is, the mail process unit 12 acts as an extraction unit that extracts human resource information corresponding to the address included in the electronic mail designated by the authorizer.

Next, in the Step S64, the mail process unit 12 makes an authorization screen 2 illustrated in FIG. 20 with use of the obtained official position and the obtained name and sends the authorization screen 2 to the client terminal 20 (the display send-receive unit 22). In the authorization screen 2 of FIG. 20, the mail addresses are converted into an official position and a name, in comparison with FIG. 19. The mail process unit 12 rearranges the order of the names by sorting with use of an official position when making the authorization screen 2. With respect to the address not included in the human resource DB 36, only the mail address is shown as an external or position unknown. That is, in the Step S64, the mail process unit 12 has a function as a send unit that sends the official position and the same extracted in the Step S62 to the client terminal 20 the authorizer uses together with the body text of the electronic mail. In the authorization screen 2, as illustrated in FIG. 20, "putting back" button for putting address back is arranged at a position of "official-position-show" button of the authorization screen 1 (FIG. 19). After the Step S64, a Step S66 of FIG. 17 is executed.

On the other hand, the display send-receive unit 22 holds it until the display send-receive unit 22 receives the authorization screen 2 from the mail process unit 12 in a Step S180 after the Step S74. Therefore, when the mail process unit 12 executes the Step S64, the display send-receive unit 22 executes a Step S182.

In the Step S182, the display send-receive unit 22 shows the authorization screen 2 on the display unit 193 (in the browser). In this case, the authorizer can simply and accurately recognize a department, a position and a name to which a sender is going to send a mail by looking at the authorization screen 2. Therefore, the authorizer can accurately determine authorization or rejection by looking at the authorization screen 2. The authorization screen 1 is not shown from the start and the authorization screen 2 is shown in accordance with a request of an authorizer because the number of the addresses is small and it may be easy to determine whether to authorize by looking at mail addresses (it is not necessary to show an official position and a name). However, the authorization screen 1 is not shown and the authorization screen 2 may be shown from the start.

Next, in a Step S184, the display send-receive unit 22 determines whether the "putting back" button is pressed by the authorizer. When it is determined as "Yes" (that is, the authorizer presses the "putting back" button", the display send-receive unit 22 shows the authorization screen 1 on the display unit 193 (in the browser) in a Step S186. The authorization screen 1 may show a screen the display send-receive unit 22 stores in a cash. However, the display send-receive unit 22 may make the mail process unit 12 make an authorization screen 1 newly as in the case of the Step S56, the Step S58 and Step S170 and may show the authorization screen 1 on the display unit 193. After the Step S186, the Step S172 is executed.

On the other hand, when it is determined as "No" in the Step S184, a Step S188 is executed. In the Step S188, the display send-receive unit 22 whether the authorizer presses the "authorize" button. When it is determined as "No", the display send-receive unit 22 determines whether the authorizer presses the "reject" button in a Step S190. When it is determined as "No" in the Step S190, the Step S184 is executed. That is, the determination loop of Step S184, the Step S188 and Step S190 is repeated for the time when the authorizer presses no button.

With respect to this case, when the authorizer presses the "authorize" button, it is determined as "Yes" in the Step S188 and a Step S192 is executed. When the authorizer does not press the "authorize" button but presses the "reject" button, it is determined as "Yes" in the Step S190 and a Step S194 is executed.

When the Step S192 is executed (the "authorize" button is pressed in the Step S176 or the Step S188), the display send-receive unit 22 sends information (authorization information) indicating an authorization by the authorizer to the mail process unit 12. On the other hand, when the Step S194 is executed (the "reject" button is pressed in the Step S178 or the Step S190), the display send-receive unit 22 information (rejection information) indicating a rejection by the authorizer to the mail process unit 12.

After the Step S192 or the Step S194, the display send-receive unit 22 terminates all processes of the authorizing process, and executes a Step S144 of FIG. 9.

Figure 17:
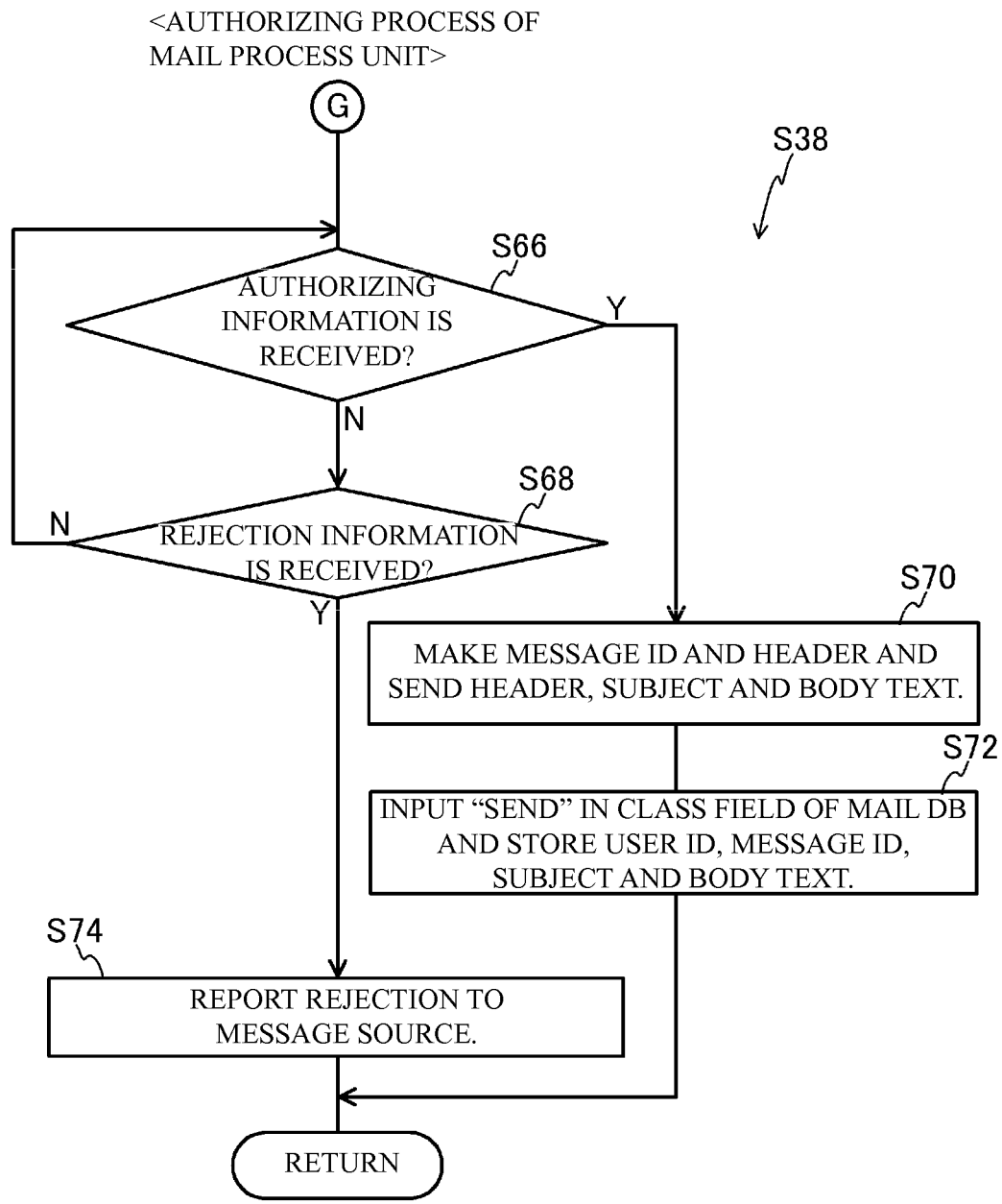
FIG. 17 illustrates the flowchart (part 3) of the authorizing process in accordance with the first embodiment.

With respect to this case, the mail process unit 12 executes the Step S66 of FIG. 17 after the Step S64 of FIG. 16 or when it is determined as "Yes" in the Step S60. In the Step S66, the mail process unit 12 determines whether the mail process unit 12 determines whether the mail process unit 12 receives authorization information from the display send-receive unit 22. When it is determined as "No", a Step S68 is executed by the mail process unit 12. In the Step S68, the mail process unit 12 determines whether the mail process unit 12 receives rejection information from the display send-receive unit 22. When it is determined as "No", the Step S66 is executed. That is, the mail process unit 12 holds it until the mail process unit 12 receives the authorization information or the rejection information. When the mail process unit 12 receives the authorization information (S66: "Yes"), a Step S70 is executed. On the other hand, when the mail process unit 12 receives the rejection information (S68: "Yes"), a Step S74 is executed.

When the Step S70 is executed, the mail process unit 12 makes a message ID and a header, and sends the header, a subject and a body text to an address (folder). The mail process unit 12 inputs "send" in the class field of the mail DB 32 and stores the user ID, the message ID, the subject and the body text. On the other hand, when the Step S74 is executed, the mail process unit 12 reports rejection information to the client terminal 20 of a message source (a user who is going to make an electronic mail and send the mail).

With the processes, when the authorizing process of the mail process unit 12 is terminated, a Step S40 of FIG. 9 is executed.

With reference to FIG. 9, in a Step S144, the display send-receive unit 22 determines whether a user outputs a logout request (whether the "logout" button of FIG. 12 is pressed). When it is determined as "No", the Step S132 is executed. On the other hand, when it is determined as "Yes" in the Step S144 (that is, the user outputs the logout request), a Step S146 is executed. In the Step S146, the display send-receive unit 22 sends the logout request to the mail server 10 (the mail processing unit 12) and terminates the process of FIG. 7 to FIG. 9.

With respect to this case, the mail process unit 12 determines whether the mail process unit 12 receives the logout request from the client terminal 20 (the display send-receive unit 22) in the Step S40. When it is determined as "No", the Step S26 is executed. When it is determined as "Yes" in the Step S40 (that is, the display send-receive unit 22 executes the Step S146), the processes of FIG. 7 to FIG. 9 are terminated.

As mentioned above, with the processes of FIG. 9 to FIG. 9, a user is capable of making and sending an electronic mail, and an authorizer is capable of authorizing the electronic mail. The authorizer is capable of performing an authorization with use of the authorization screen 2 in which an official position and a name are shown, by pressing the official-position-show button in the authorization screen 1.

As mentioned above in detail, in accordance with the first embodiment, the mail process unit 12 refers to the human resource DB 36 when accepting an official-position-show request by an authorizer, and reads an official position and a name corresponding to an address included in an electronic mail. And, the mail process unit 12 sends information of the official position and the name to the client terminal 20 (the display send-receive unit 22) the authorizer uses together with a body text of the electronic mail. In the first embodiment, information supporting an address confirmation of an electronic mail is sent to the client terminal 20 an authorizer uses. Therefore, the authorizer is capable of simply and accurately recognizing a department, a position and a name of an address of an electronic mail made by his or her follower staff when authorizing the electronic mail. Therefore, the authorizer is capable of accurately determining authorization or rejection with respect to sending of an electronic mail. It is therefore possible to suppress occurrence of information leakage caused by erroneous sending of an electronic mail.

In the first embodiment, the sending process of the authorizing process are executed in a single flowchart. However, the sending process and the authorizing process may be executed in a plurality of flowchart independently.

In the first embodiment, an official position in a company is shown. However, when a mail address out of the company is included in an address, "external" may be shown as the official position. When a company is determined by a domain, a name of a company related to a domain may be shown.

In the first embodiment, authorization can be performed even if an official position and a name of an address of an electronic mail to be authorized are not shown. However, for example, when the number of the addresses is equal to or more than a predetermined value, an authorizer may not be capable of performing authorization unless the authorizer have the official position and the name displayed. When the number of the addresses is equal to or more than a predetermined value and an authorization is performed without displaying the official position and the name, a confirmation message may be shown. When the number of the addresses is equal to or more than a predetermined value, the official position and the name are forced to be shown.

Second Embodiment

Next, a description will be given of a second embodiment of the electronic mail system with reference to FIG. 21 and FIG. 22. In the second embodiment, being different from the first embodiment, when a user is going to make a reply mail to another mail, an official position and a name of a person of an address is shown in a message creation screen. Only a part of a process of the second embodiment is different from that of the first embodiment. Therefore, the same numeral is added to the same process and the same determination. And the explanation of the same process and the same determination is omitted or simplified. In the second embodiment, the authorizing process of the first embodiment is not performed. Therefore, the authorization mail DB 36 may be omitted.

Figure 21:
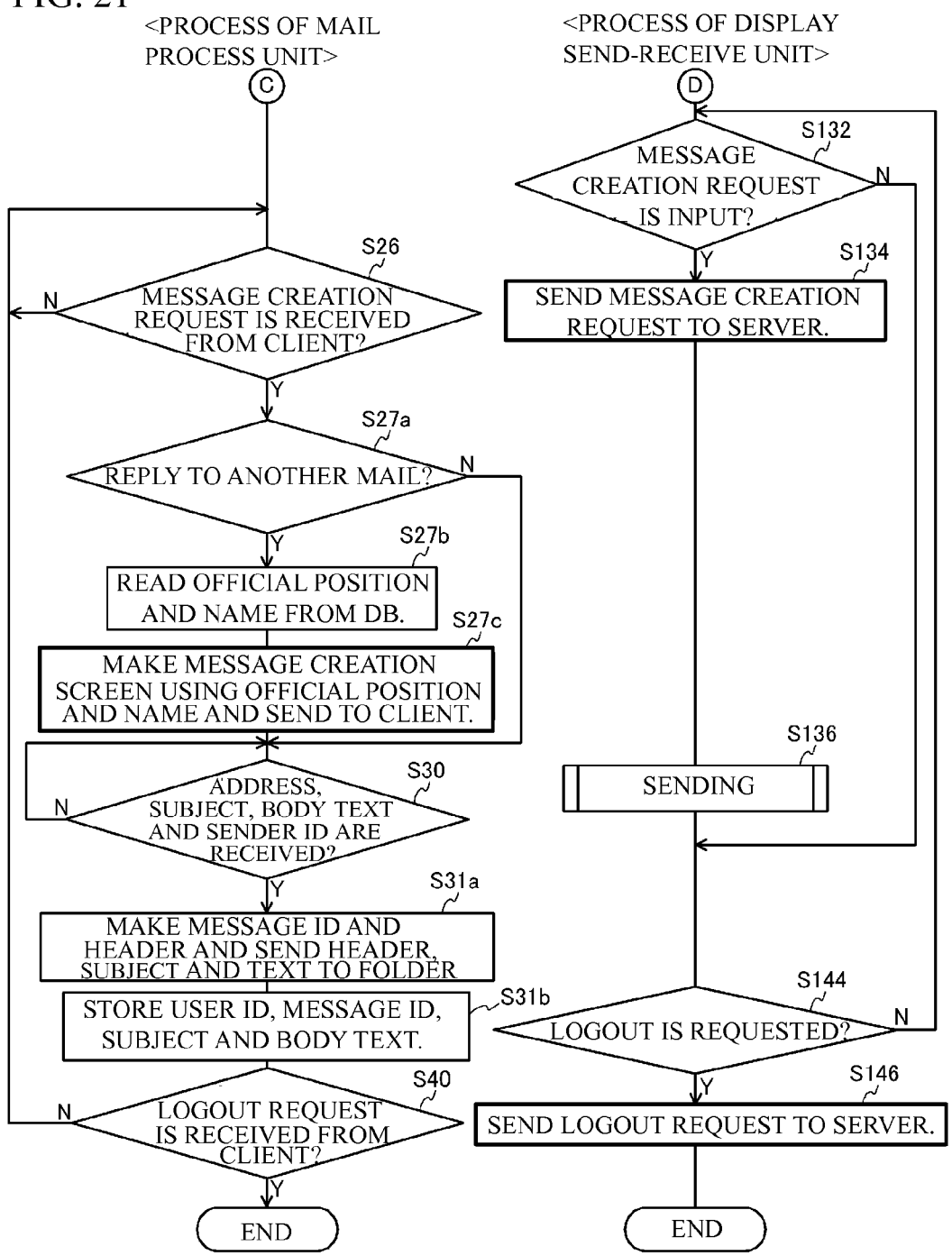
FIG. 21 illustrates a flowchart of a sequence of a process of a mail process unit and a display send-receive unit in accordance with a second embodiment (corresponding to the flowchart of FIG. 9 of the first embodiment)

FIG. 21 illustrates a part of a process of the mail process unit 12 and the display send-receive unit 22 (a process following after the process of FIG. 7 and FIG. 8 of the first embodiment).

In a process of FIG. 21, after the process of FIG. 7 and FIG. 8 (the authenticating process and a showing process of a mail-show screen), in a Step S132, the display send-receive unit 22 of the client terminal 20 determines whether a message creation request is input by a user (a user who is going to make an electronic mail as a second user). In this case, the user outputs the message creation request by pressing one of the "new document" button, the "reply to sender" button and the "reply to all" button on the mail-show screen (FIG. 12). When it is determined as "No" in the Step S132, a Step S144 is executed. On the other hand, it is determined as "Yes" in the Step S132, a Step S134 is executed. When the Step S134 is executed, the display send-receive unit 22 sends the message creation request to the mail process unit 12 of the mail server 10, and after that, executes the sending process (the same process as FIG. 14 of the first embodiment) in a Step S136.

With respect to this case, the mail process unit 12 holds it until the mail process unit 12 receives the message creation request from the client terminal 20 (the display send-receive unit 22) in a Step S26. In this case, when the display send-receive unit 22 executes the Step S134, a Step S27a is executed.

In the Step S27a, the mail process unit 12 determines whether the message creation request received from the client terminal 20 is a creation request of a reply message with respect to another mail. When it is determined as "No", the Step S30 is executed. When it is determined as "Yes", a Step S27b is executed.

In the Step S27b, the mail process unit 12 refers to the human resource DB 36 and extracts an official position and a name of an address of the reply message. Next, in a Step S27c, the mail process unit 12 makes a message creation screen with used of the official position and the name and sends the screen to the client terminal 20 (the display send-receive unit 22). FIG. 22 illustrates the message creation screen that is made and sent in the Step S27c. As illustrated in FIG. 22, in the address field of the message creation screen, the official positions and the names are shown, and the order is rearranged by a sorting with use of the official position.

The screen of FIG. 22 is shown on the display unit 193 of the client terminal 20 in the Step S152 of the sending process of FIG. 14. In this case, a user (a second user) who is making a reply mail to at least one of addresses designated by a sender as a first user of a source mail is capable of simply and accurately recognizing a department, a position and a name to which the user is going to send the reply mail by looking at the screen of FIG. 22. Therefore, the user who is going to make a reply mail is capable of accurately determine whether to send the reply mail to all addresses by looking at the screen of FIG. 22.

Next, in the Step S30, the mail process unit 12 holds it until the mail process unit 12 receives an address, a subject, a body text and a sender ID. In this case, the mail process unit 12 executes the Step S32 at the timing when the Step S158 of FIG. 14 is executed.

Next, in a Step S31a, the mail process unit 12 makes a message ID and a header and sends the header, the subject and the body text to an address (folder). The mail process unit 12 input "send" in the class field of the mail DB 32 and stores the user ID, the message ID, the subject and the body text.

After that, the above-mentioned process is repeated until a logout request is input by a user (it is determined as "Yes" in the Step S148 after it is determined as "Yes" in the Step S144 and the Step S146 is executed.).

As mentioned above, in the second embodiment, when the mail process unit 12 accepts a creation request of a reply mail designating an electronic mail by a user who is going to make a mail (S26: Yes), the mail process unit 12 refers to the human resource DB 36 and reads an official position and a name corresponding to an address included in the electronic mail designated by the user. And, the mail process unit 12 has information of the official position and the name shown in the message creation screen together with a body text of the electronic mail and sends the information to the client terminal 20 (the display send-receive unit 22) the user uses together with the body text of the electronic mail. In the second embodiment, information supporting an address confirmation of an electronic mail is sent to the client terminal 20 which a user making a reply mail uses. Therefore, the user is capable of simply and accurately recognizing a department, a position and a name of an address of an electronic mail when making a reply mail. Therefore, the user is capable of accurately determining whether to send an electronic mail. It is therefore possible to suppress occurrence of information leakage caused by erroneous sending of an electronic mail.

In the second embodiment, when the message creation request is making a reply mail, an official position and a name are shown in a message creation screen. However, for example, when a reply mail includes a plurality of addresses or when the replay mail is a reply-to-all mail with respect to a broadcast mail, the official position and the name may be shown in the message creation screen. In this way, it is possible to effectively suppress occurrence of information leakage by showing an official position and a name on a message creation screen when making a reply mail to a plurality of addresses.

In the second embodiment, the official position and the name are automatically shown during making a reply mail. However, as in the case of the first embodiment, the official position may not be shown on the message creation screen at a first stage, and a "official-position-show" button may be provided, and the official position and the name may be shown when a user presses the "official-position-show" button.

In the second embodiment, the official position and the name are shown during making a reply mail. However, an official position and a name of a sender or a person included in an address designated by the sender may be shown when receiving an electronic mail.

The second embodiment may be combined with the first embodiment. That is, the authorizing process may be included in the flowchart of FIG. 21.

Third Embodiment

Next, a description will be given of a third embodiment of the electronic mail system with reference to FIG. 23 to FIG. 30 in detail. In the third embodiment, the client terminal 20 makes and shows a screen in accordance with information sent from the mail server 10 by executing a program of a mail client being different from the first and second embodiment in which the client terminal 20 obtains a screen relating to an electronic mail made by the mail server 10 and the screen is shown in the browser (WEB mail).

Figure 23:
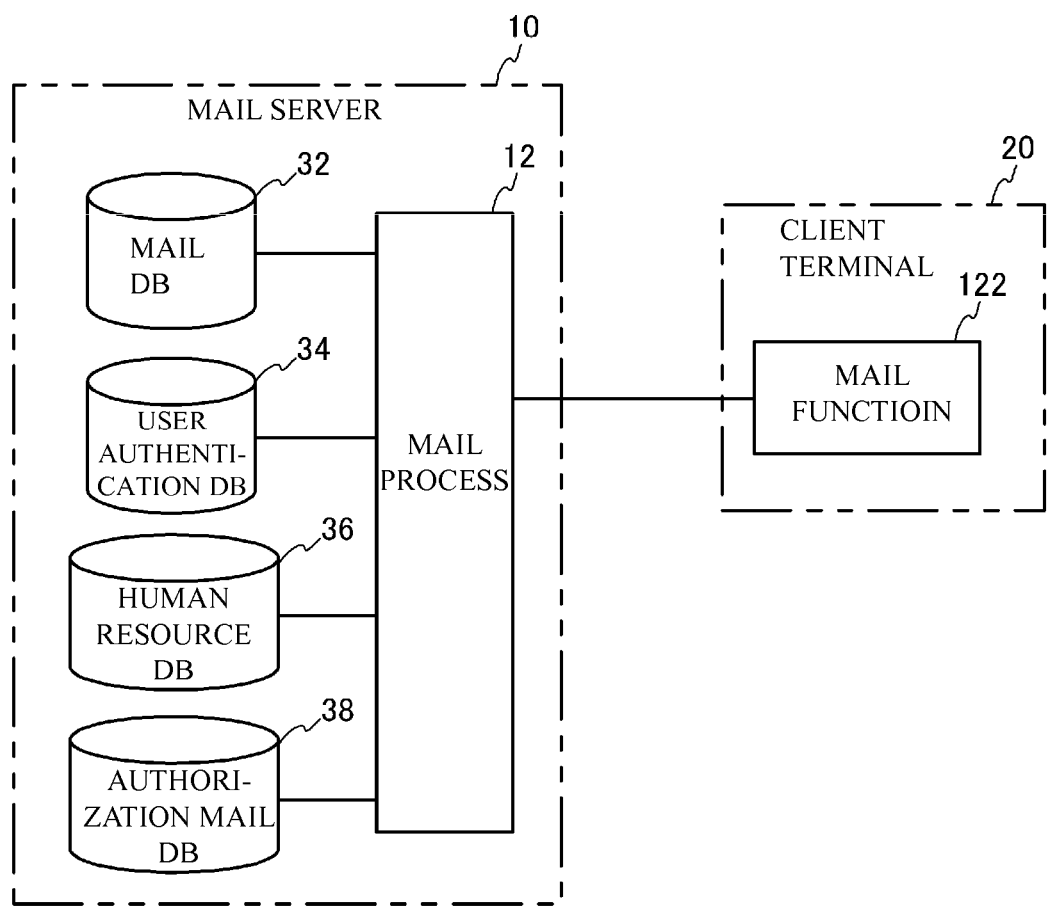
FIG. 23 illustrates a function block diagram of a mail server and a client terminal in accordance with a third embodiment.

In the client terminal 20 of the third embodiment, the CPU 190 executes a program (mail client) and thereby a mail function unit 122 illustrated in FIG. 23 is realized. The mail function unit 122 performs an operation of the mail client (showing a screen relating to an electronic mail, sending information input by a user to the mail server 10, receiving information with respect to an electronic mail from the mail server 10). In the third embodiment, the mail process unit 12 of the mail server 10 does not performs making a screen with respect to an electronic mail or sending a screen to the client terminal 20, being different from the first embodiment.

A description will be given of a process of the mail process unit 12 of the mail server 10 and the mail function unit 122 of the client terminal 20 with reference to FIG. 24 to FIG. 30, in comparison with the flowchart of the first embodiment.

Figure 24:
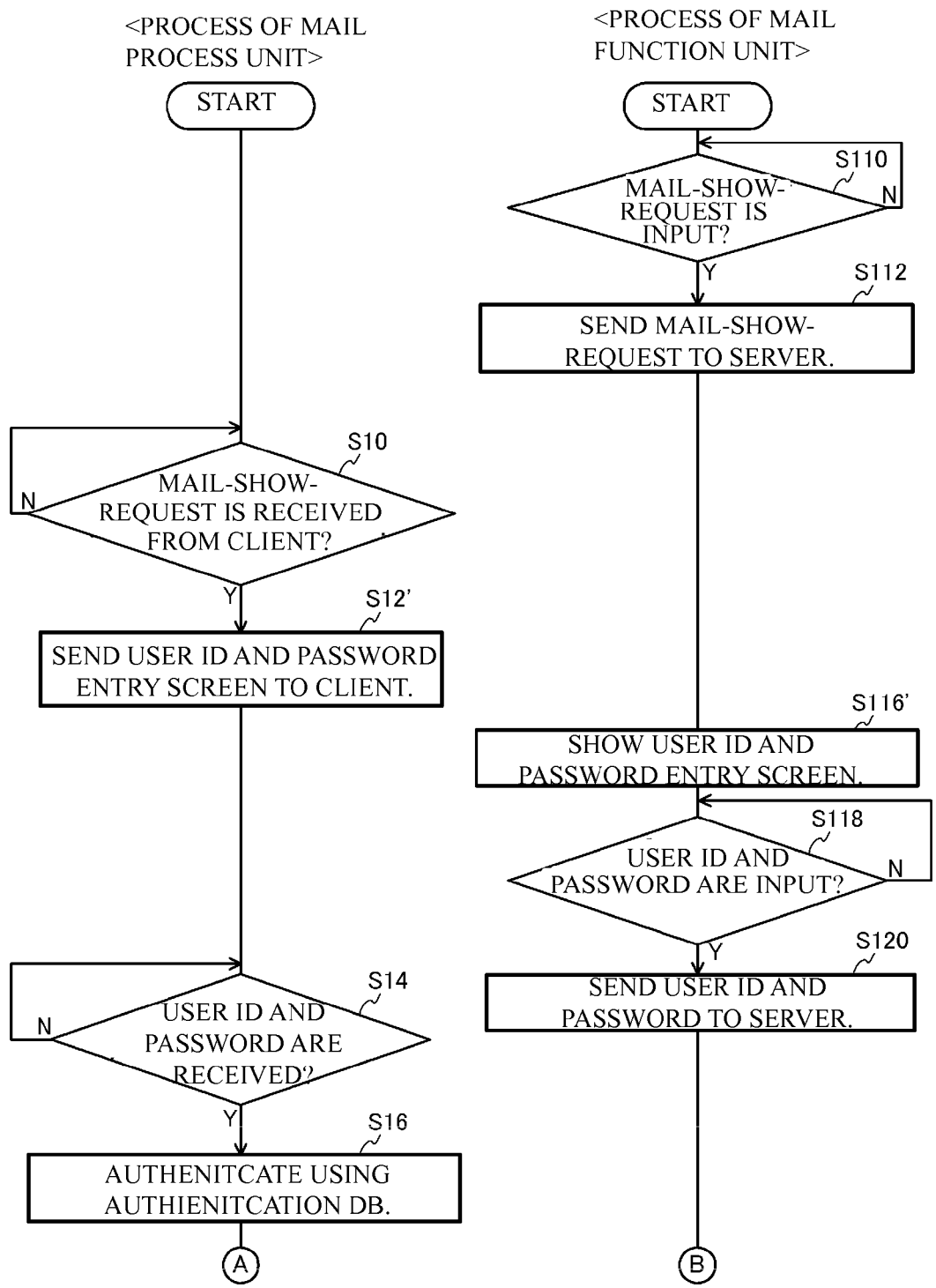
FIG. 24 illustrates a flowchart (part 1) of a sequence of a process of a mail process unit and a mail function unit in accordance with the third embodiment.
Figure 25:
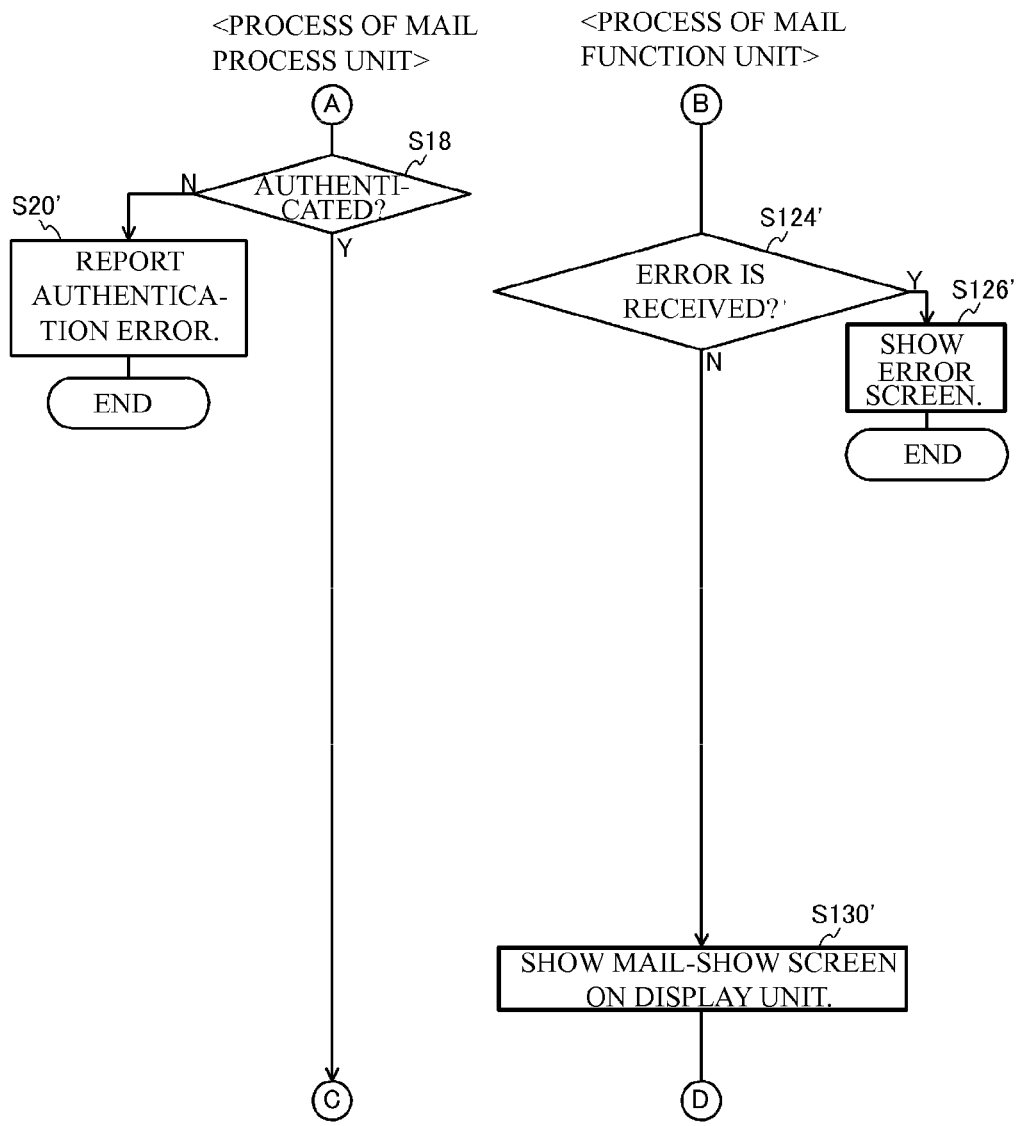
FIG. 25 illustrates the flowchart (part 2) of the sequence of the process of the mail process unit and the mail function unit in accordance with the third embodiment.
Figure 26:
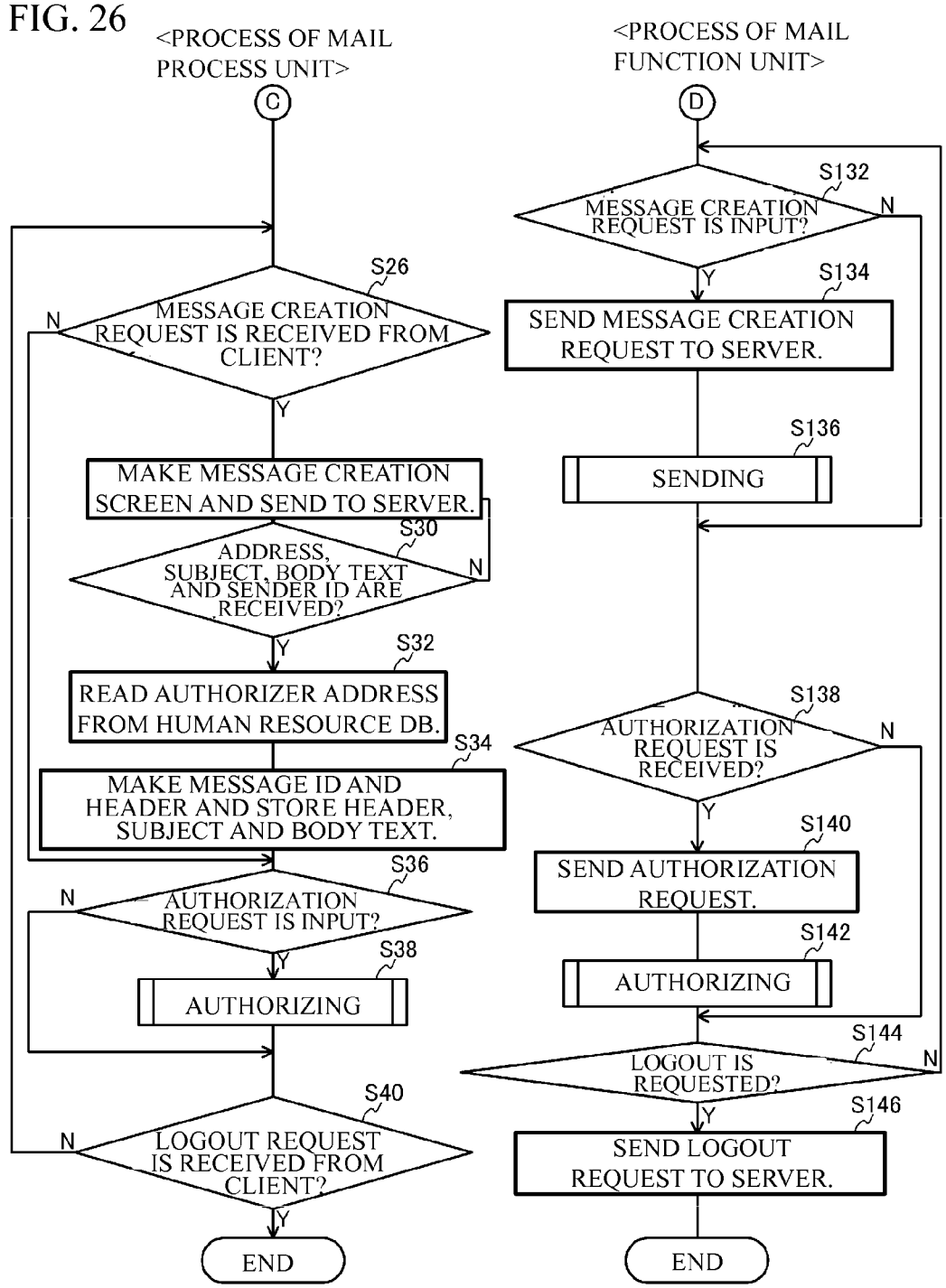
FIG. 26 illustrates the flowchart (part 3) of the sequence of the process of the mail process unit and the mail function unit in accordance with the third embodiment.
Figure 27:
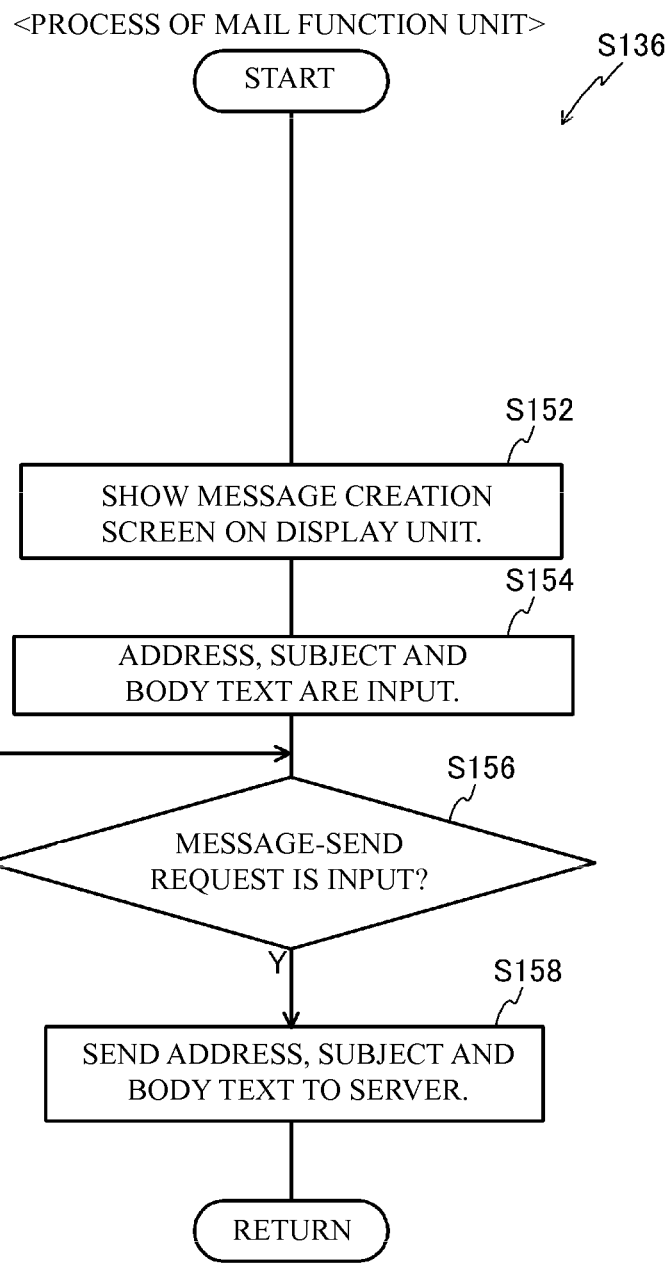
FIG. 27 illustrates a flowchart of details of a sending process (Step S136) by the display send-receive unit in accordance with the third embodiment.
Figure 28:
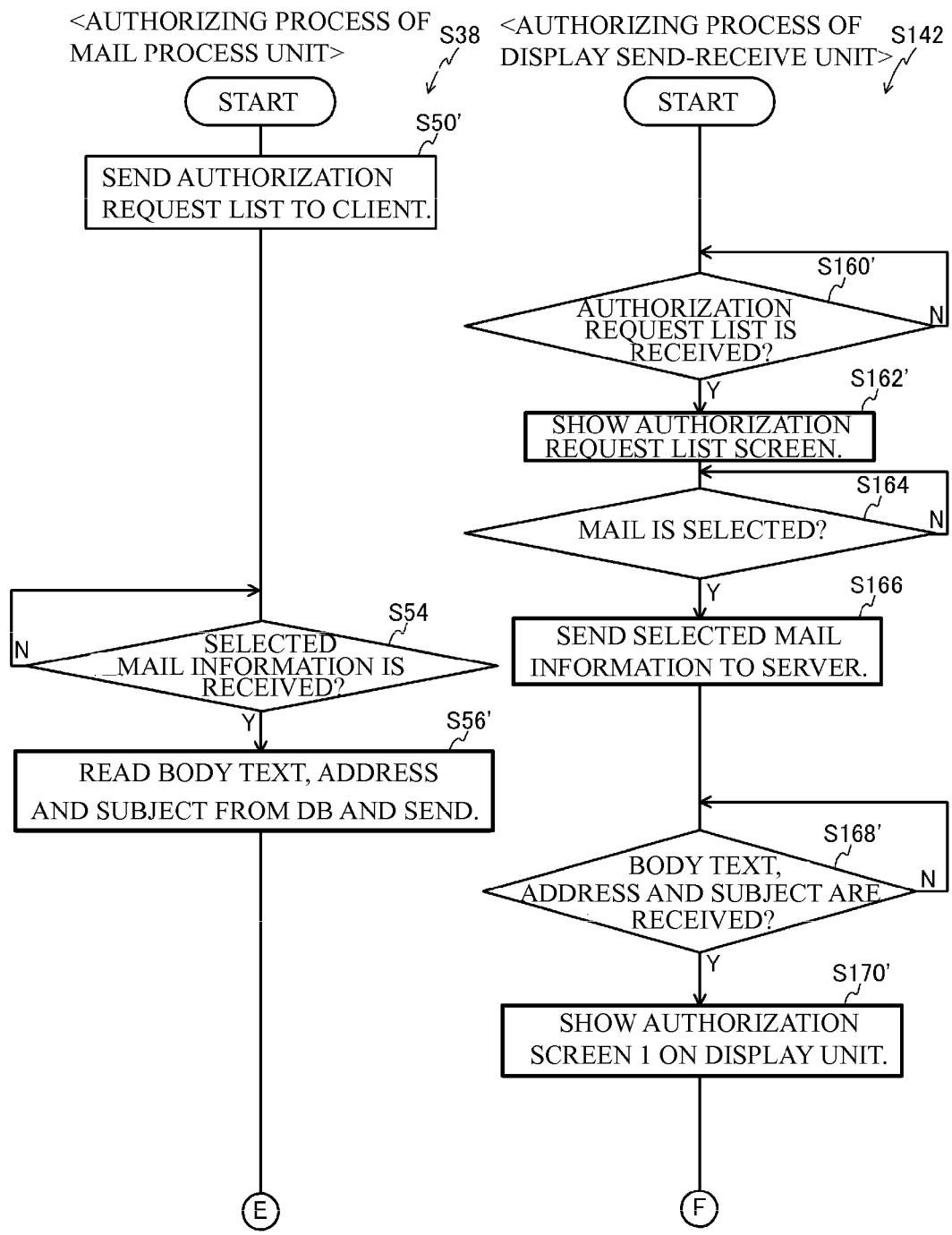
FIG. 28 illustrates a flowchart (part 1) of an authorizing process in accordance with the third embodiment.
Figure 29:
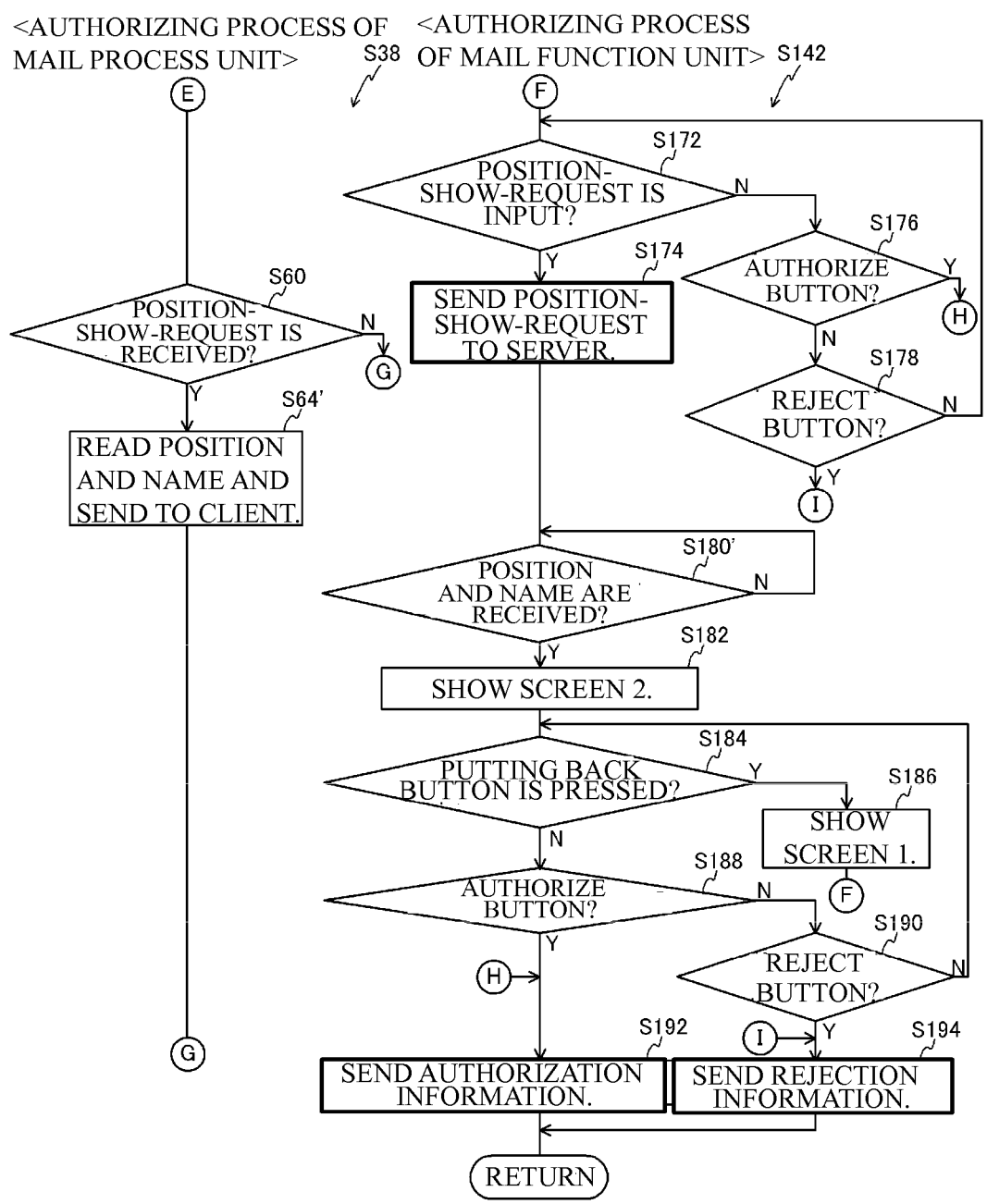
FIG. 29 illustrates the flowchart (part 2) of the authorizing process in accordance with the third embodiment.
Figure 30:
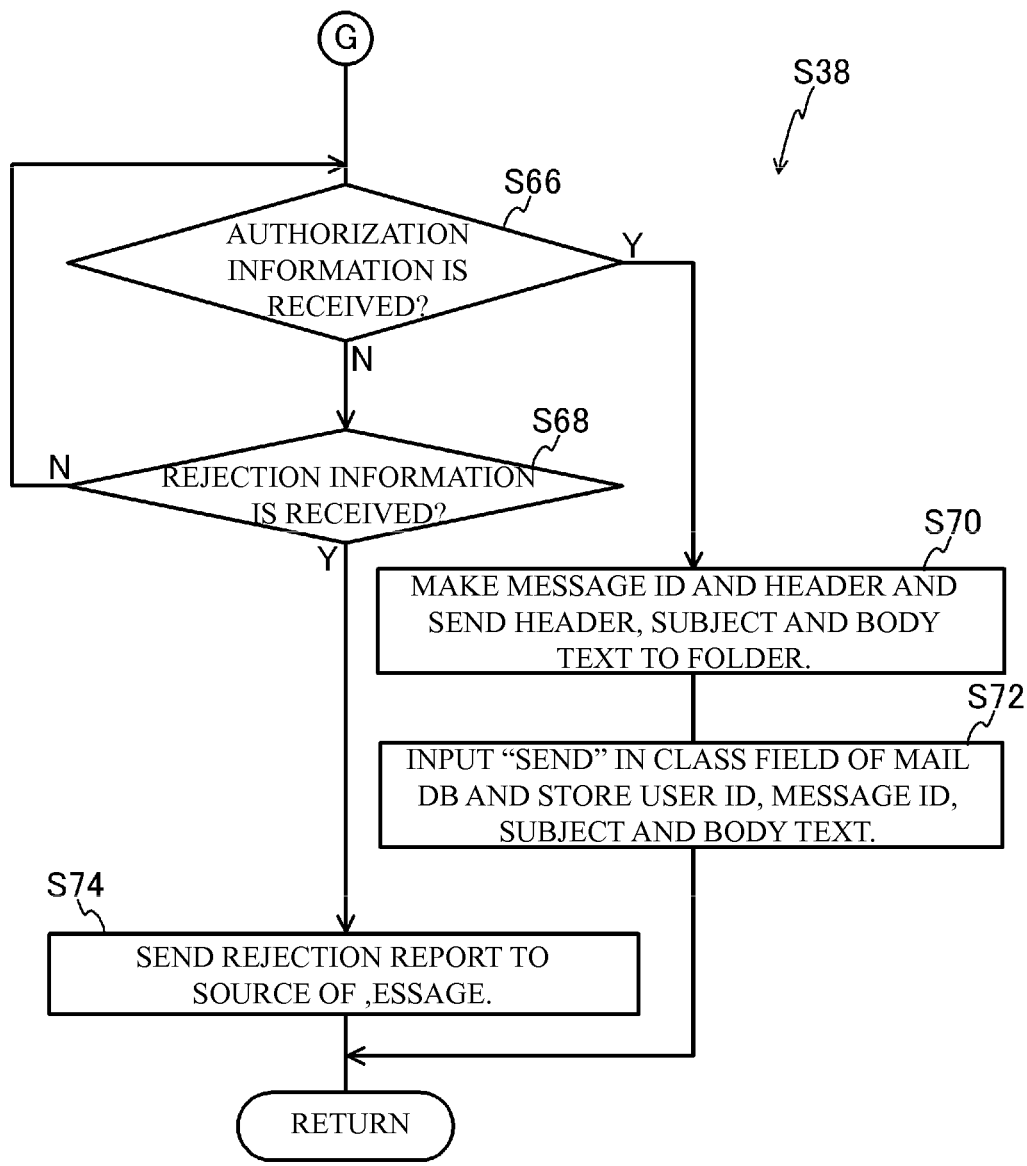
FIG. 30 illustrates the flowchart (part 3) of the authorizing process in accordance with the third embodiment.

FIG. 24 to FIG. 26 illustrate a flowchart of a process of the mail process unit 12 and the mail function unit 122 and corresponds to FIG. 7 to FIG. 9 of the first embodiment. FIG. 27 illustrates a flowchart of the sending process of the mail function unit 122 and corresponding to FIG. 14 of the first embodiment. FIG. 28 to FIG. 30 illustrate a flowchart of the authorizing process of the mail process unit 12 and the mail function unit 122 and correspond to FIG. 15 to FIG. 17 of the first embodiment.

A description will be given of a process of FIG. 24. In the process of FIG. 24, in comparison with FIG. 7, the mail function unit 122 does not executer the Step S144 in the process of the display send-receive unit 22 of the first embodiment. The mail process unit 12 executes a Step S12' instead of the Step S12 in the process of the mail process unit 12 of the first embodiment. In the Step S12', the mail process unit 12 sends a user ID and a password-entry request to the mail function unit 122 without sending the user ID and the password entry screen. In a Step S116', the mail function unit 122 shows a user ID and a password entry screen prepared in advance.

A description will be given of a process of FIG. 25. In the process of FIG. 25, in comparison with FIG. 8, the mail process unit 12 reports an authentication error without reporting an authentication error screen in a Step S20' when the authentication is not succeeded (S18: No). The mail process unit 12 does not execute the Step S22 and the Step S24 in the process of the mail process unit 12 of the first embodiment. On the other hand, when the mail function unit 122 receives an authentication error (S124': Yes), the mail function unit 122 shoes an authentication error screen prepared in advance in a Step S126'. When the mail function unit 122 does not receive the authentication error (S124': Yes), the mail function unit 122 shows a mail-show screen on the display unit 193 in a Step S130'. The mail function unit 122 does not execute the Step S28 in the process of the display send-receive unit 22 of the first embodiment.

In a process of FIG. 26, in comparison with FIG. 9, the mail process unit 12 does not execute the Step S28 (making and sending a message creation screen). In a sending process of the mail function unit 122 of FIG. 27, in comparison with FIG. 14, the Step S150 (process whether to receive a message creation screen) is not executed.

Next, a description will be given of a process of FIG. 28. In the process of FIG. 28, in comparison with the process of FIG. 15, the mail process unit 12 executes a Step S50' instead of the Step S50 and the Step S52, and executes a Step S56' instead of the Step S56 and the Step S58 in the process of the mail process unit 12 of the first embodiment. In the Step S50', the mail process unit 12 sends an authorization request list to the mail function unit 122 with use of the authorization mail DB 38 without sending an authorization request list screen. In the Step S56', the mail process unit 12 refers to the authorization mail DB 38 and sends information of a body text, an address and a subject of a selected mail when receiving information of the selected mail from the client terminal 20 side (an authorizer checks a check box on a screen of FIG. 18 and presses a send button). On the other hand, the mail function unit 122 executes a Step S160' and a Step S162' instead of the Step S160 and the Step S162 of the process of the display send-receive unit 22 of the first embodiment, and executes a Step S168' and a Step S170' instead of the Step S160 and the Step S162. In the Step S160', the mail function unit 122 holds it until the mail function unit 122 receives an authorization request list from the mail process unit 12. In the Step S162', the mail function unit 122 makes and shows an authorization request list with use of the received authorization request list. In the Step S168', the mail function unit 122 holds it until the mail function unit 122 receives a body text, an address and a subject from the mail server 10 (the mail process unit 12). In the Step S170', the mail function unit 122 makes an authorization screen 1 illustrated in FIG. 19 based on the received body text, the received address and the received subject and shows the authorization screen 1 on the display unit 193.

Next, a description sill be given of a process of FIG. 29. In the process of FIG. 29, in comparison with the process of FIG. 16, the mail process unit 12 executes a Step S64' instead of the Step S62 and the Step S64 in the process of the mail process unit 12 of the first embodiment. In the Step S64', when the mail process unit 12 receives an official-position-show request from the client terminal 20 side, the mail process unit 12 reads an official position and a name from the human resource DB 36 and sends the official position and the name to the client terminal 20. And in the process of FIG. 29, in comparison with the process of FIG. 16, the mail function unit 122 executes a Step S180' and a Step S182' instead of the Step S180 and the Step S182 of the display send-receive unit 22 of the first embodiment. In the Step S180', the mail function unit 122 holds it until the mail function unit 122 receives an official position and a name from the mail server 10 (the mail process unit 12). In the Step S182', the mail function unit 122 makes an authorization screen 2 (FIG. 20) based on the received official position and the received name, and shows the screen on the display unit 193. A process of FIG. 30 is the same as the process of FIG. 17. Therefore explanation is omitted.

As mentioned above, in the third embodiment, when the mail client is used in the client terminal 20, an address can be shown with use of an official position and a name as in the case of the first embodiment. Thus, as in the case of the first embodiment, it is possible to provide information supporting an address confirmation of an electronic mail to an authorizer. Therefore, the authorizer is capable of simply and accurately recognizing a department, a position and a name of an address of an electronic mail made by his or her follower staff when authorizing the electronic mail. Therefore, the authorizer is capable of accurately determining whether authorize the electronic mail. It is therefore possible to suppress occurrence of information leakage caused by erroneous sending of an electronic mail.

Figure 31:
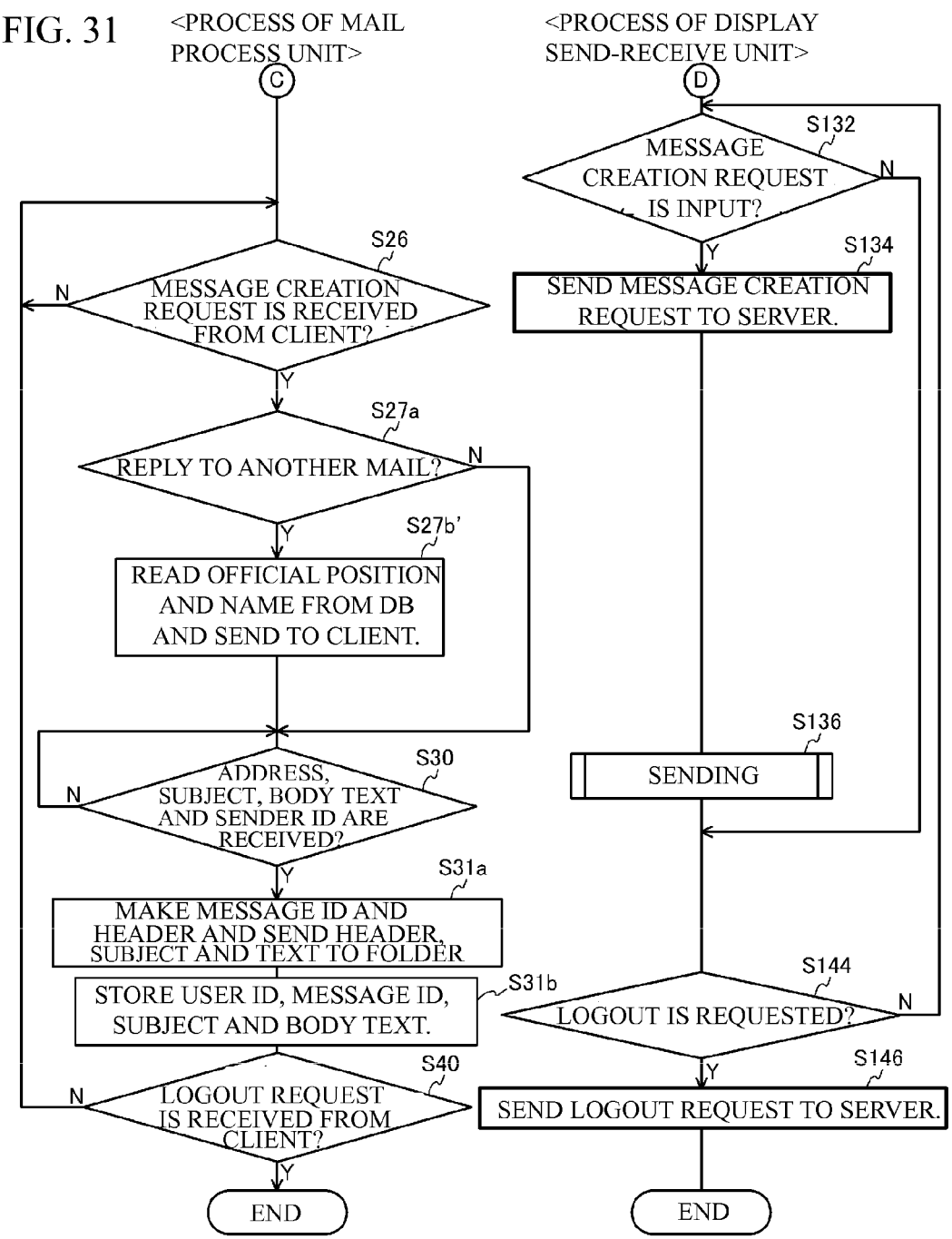
FIG. 31 illustrates a flowchart of a sequence of a process of a mail process unit and a display send-receive unit in accordance with a modified embodiment (corresponding to FIG. 21 of the second embodiment)

The second embodiment may adopted in the electronic mail system using the mail client. In this case, a process of FIG. 31 may be performed instead of the process of FIG. 26 of the third embodiment. In the process of FIG. 31, a part of the process of FIG. 21 of the second embodiment is changed.

In the process of FIG. 31, the mail process unit 12 executes a Step S27b' instead of the Step S27b and the Step S27c in the process of the mail process unit 12 of the second embodiment. In the Step S27b', the mail process unit 12 refers to the human resource DB 36, reads an official position and a name corresponding to an address of a reply mail, and sends the official position and the name to the client terminal 20 (the mail function unit 122).

Figure 32:
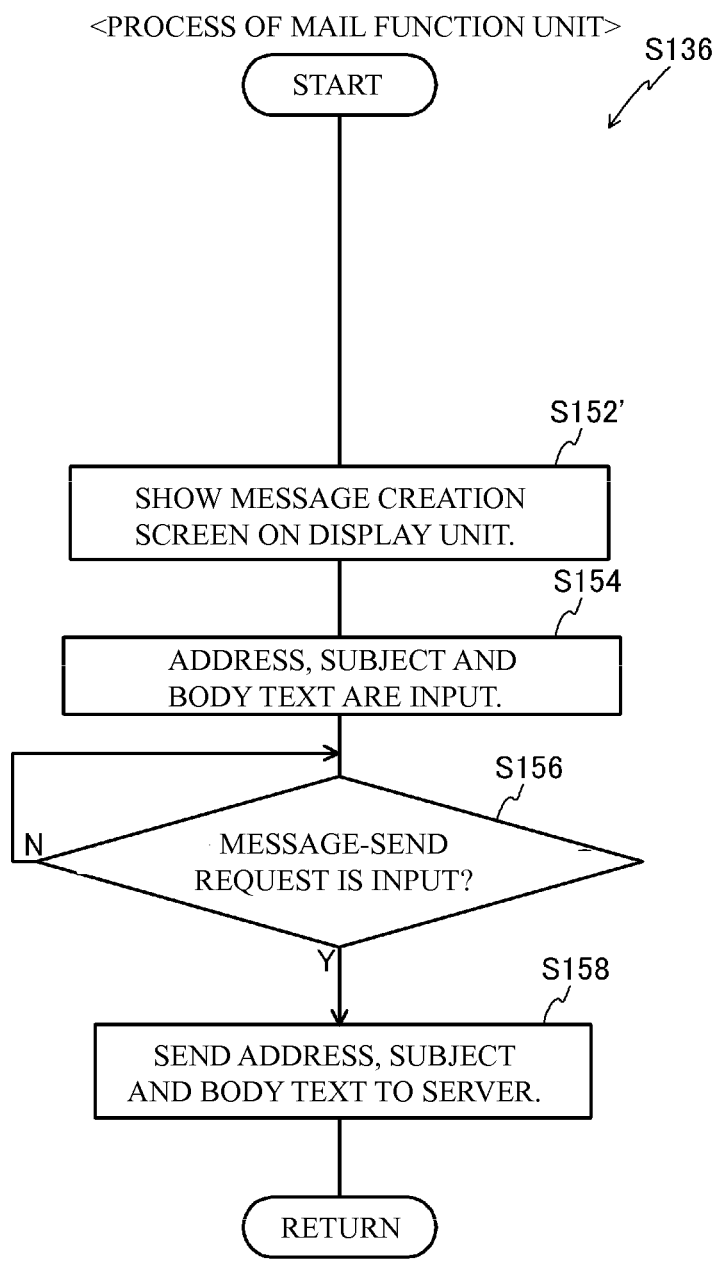
FIG. 32 illustrates details of a sending process of a mail function unit of FIG. 31 (Step S136).

In the process of FIG. 31 (the Step S136), as illustrated in FIG. 32, when the mail function unit 122 receives an official position and a name in the Step S152', the mail function unit 122 makes a message creation screen with use of the received official position and the received name and sends the message creation screen shows on the display unit 193. On the other hand, when the mail function unit 122 does not receive the official position and the name, the mail function unit 122 makes a message creation screen without an official position and a name and shows the message creation screen on the display unit 193. The other process is the same as FIG. 14.

Performing the process of FIG. 31 and FIG. 32, the same process as the second embodiment can be adopted in the electronic mail system using the mail client. Therefore, as in the case of the second embodiment, the user is capable of simply and accurately recognizing a department, a position and a name of an address of an electronic mail when making a reply mail. Therefore, the user is capable of accurately determining whether to send an electronic mail. It is therefore possible to suppress occurrence of information leakage caused by erroneous sending of an electronic mail.

The above-mentioned functions are realized by a computer. In this case, a program having a process of a function which a process device should have is provided. When the computer executes the program, the above-mentioned functions are realized in the computer. The program having the process may be stored in a storage medium (except for a carrier wave) that is readable by the computer.

When the program is distributed, a movable storage medium such as a DVD (Digital Versatile Disc) or a CD-ROM (Compact Disc Read Only Memory) in which the program is stored are sold. And a storage device of a server computer may store the program, and the server computer may send the program to another computer via a network.

The computer executing a program stores a program stored in a movable storage medium or a program sent by the server computer in a storage device. And, the computer reads the program from the storage device, and executes processes in accordance with the program. The computer may read the program directly from the movable storage medium and executes a process in accordance with the program. The computer may execute a process in accordance with a received program sequentially each time when the program is sent from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A computer readable, non-transitory medium storing a program that causes a computer to execute a process, the process comprising:

accepting electronic mail information of an electronic mail created at a first terminal, the electronic mail information including mail body text information and address information, the address information containing at least one address;

when a request is accepted from a second terminal, that designates the electronic mail information, extracting human resource information corresponding to an address contained in the address information in accordance with referring to a storage unit that stores human resource information of a person corresponding to the address and sending the extracted human resource information to the second terminal together with the mail body text information included in the electronic mail information; and when the request is not accepted from the second terminal, restricting a processing of the electronic mail at the second terminal in accordance with whether a number of addresses contained in the address information included in the electronic mail information is equal to or greater than a predetermined number.

2. The medium as claimed in claim 1, wherein:
the restricting includes forbidding the processing of the electronic mail till the request is accepted.

3. The medium as claimed in claim 1 wherein:
the restricting includes disrupting the processing of the electronic mail by sending a confirmation message to the second terminal.

4. The medium as claimed in claim 1 wherein:
the request that designates the electronic mail information is a show-request that designates an electronic mail created at the first terminal from the second terminal used by a user who is to authorize sending of the electronic mail created at the first terminal.

5. An electronic mail information send method that makes a computer execute a process, the process comprising:
accepting electronic mail information of an electronic mail created at a first terminal, the electronic mail information including mail body text information and address information, the address information containing at least one address;
when a request is accepted from a second terminal, that designates the electronic mail information, extracting human resource information corresponding to an address contained in the address information in accordance with referring to a storage unit that stores human resource information of a person corresponding to the address and sending the extracted human resource information to the second terminal together with the mail body text information included in the electronic mail information; and
when the request is not accepted from the second terminal, restricting a processing of the electronic mail at the second terminal in accordance with whether a number of addresses contained in the address information included in the electronic mail information is equal to or greater than a predetermined number.

6. The method as claimed in claim 5, wherein:
the restricting included forbidding the processing of the electronic mail till the request is accepted.

7. The method as claimed in claim 5 wherein:
the restricting includes disrupting the processing of the electronic mail by sending a confirmation message to the second terminal.

8. The method as claimed in claim 5 wherein:
the request that designates the electronic mail information is a show-request that designates an electronic mail created at the first terminal from the second terminal used by a user who is to authorize sending of the electronic mail created at the first terminal.

9. An electronic mail information send device comprising:
a memory; and
a circuitry,
wherein the circuitry is configured:
to accept electronic mail information of an electronic mail created at a first terminal, the electronic mail information including mail body text information and address information, the address information containing at least one address;
wherein the memory is configured to relate an address to human resource information of a person corresponding to the address and store the address and the human resource information,
wherein the circuitry is configured:
when a request is accepted from a second terminal, that designates the electronic mail information,
to extract human resource information corresponding to the address contained in the address information included in the electronic mail information from the memory; and
to send the extracted human resource information to the second terminal together with the mail body text information included in the electronic mail information, and
when the request is not accepted from the second terminal,
to restrict a processing of the electronic mail at the second terminal in accordance with whether a number of addresses contained in the address information included in the electronic mail information is equal to or greater than a predetermined number.

10. The electronic mail information send device as claimed in claim 9, wherein:
the circuitry is configured to forbid the processing of the electronic mail till the request is accepted.

11. The electronic mail information send device as claimed in claim 9, wherein:
the circuitry is configured to disrupt the processing of the electronic mail by sending a confirmation message to the second terminal.

12. The electronic mail information send device as claimed in claim 9, wherein:
the request that designates the electronic mail information is a show-request that designates an electronic mail created at the first terminal from the second terminal used by a user who is authorized sending of the electronic mail created at the first terminal.

* * * * *